United States Patent
Apostolides et al.

(10) Patent No.: US 11,221,106 B2
(45) Date of Patent: *Jan. 11, 2022

(54) SUPPLEMENTAL FILTRATION FOR MACHINE FLUID SYSTEMS

(71) Applicant: RPM INDUSTRIES, LLC, Washington, PA (US)

(72) Inventors: John K. Apostolides, Pittsburgh, PA (US); John J. McCosby, Washington, PA (US)

(73) Assignee: RPM INDUSTRIES, LLC, Washington, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/571,364

(22) Filed: Sep. 16, 2019

(65) Prior Publication Data

US 2020/0011486 A1    Jan. 9, 2020

Related U.S. Application Data

(63) Continuation of application No. 15/700,772, filed on Sep. 11, 2017, now Pat. No. 10,436,390, which is a continuation of application No. 13/492,234, filed on Jun. 8, 2012, now Pat. No. 9,759,385.

(51) Int. Cl.
    *B01D 37/04*    (2006.01)
    *B01D 46/00*    (2006.01)
    *F17D 1/14*     (2006.01)

(52) U.S. Cl.
    CPC ............... *F17D 1/14* (2013.01); *B01D 37/04* (2013.01); *B01D 46/00* (2013.01)

(58) Field of Classification Search
    CPC ......... F01M 11/0408; F01M 2001/123; F01M 2001/1057; F16N 39/06; F17D 1/14; B01D 37/04; B01D 46/00
    USPC ..... 210/416.1, 416.4, 416.5, 143, 149, 96.1, 210/97; 137/2, 10, 551, 565.01, 656.11, 137/656.37, 625
    See application file for complete search history.

(56) References Cited

U.S. PATENT DOCUMENTS 5,564,280 A    10/1996 Schilling et al.
5,918,573 A    7/1999 Killion
(Continued)

FOREIGN PATENT DOCUMENTS

EP    0500487 A1    8/1992
EP    0709553 A1 *  5/1996    ............... F01M 1/10

OTHER PUBLICATIONS

Huber, EP 0709553, English machine translation, pp. 1-4. (Year: 1996).*

(Continued)

*Primary Examiner* — Claire A Norris
(74) *Attorney, Agent, or Firm* — K&L Gates LLP

(57) ABSTRACT

A fluid filtration apparatus. The fluid filtration apparatus includes a pump, a filter apparatus and a valve assembly. An inlet of the valve assembly shares a common junction with an outlet of the pump and an inlet of the filter apparatus. The fluid filtration apparatus further includes a sensor configured to detect a filter triggering condition and a control module coupled to the sensor and the valve assembly. The control module is configured to control operation of the pump based on the detected filter triggering condition.

16 Claims, 11 Drawing Sheets

(56) References Cited

U.S. PATENT DOCUMENTS

| | | | |
|---|---|---|---|
| 6,510,830 B2 * | 1/2003 | Rossiter | F01M 5/00 |
| | | | 123/196 AB |
| 6,572,762 B2 | 6/2003 | Maxwell et al. | |
| 6,592,486 B1 | 7/2003 | Arbanas et al. | |
| 6,619,112 B2 | 9/2003 | Juhasz | |
| 6,853,954 B2 | 2/2005 | Apostolides | |
| 6,951,606 B2 | 10/2005 | Cousineau et al. | |
| 7,055,486 B2 | 6/2006 | Hoff et al. | |
| 7,150,286 B2 | 12/2006 | Apostolides | |
| 7,163,086 B2 | 1/2007 | Care et al. | |
| 7,508,149 B2 | 3/2009 | Patel | |
| 7,689,368 B2 | 3/2010 | Douglas | |
| 7,793,681 B2 | 9/2010 | Apostolides | |
| 8,269,360 B2 | 9/2012 | Boisvert et al. | |
| 8,945,400 B2 | 2/2015 | Reinosa | |
| 9,062,575 B2 | 6/2015 | Apostolides | |
| 9,759,385 B2 | 9/2017 | Apostolides et al. | |
| 10,436,390 B2 | 10/2019 | Apostolides et al. | |
| 2006/0065217 A1 * | 3/2006 | Ikegawa | F01M 1/12 |
| | | | 123/41.42 |
| 2007/0181102 A1 * | 8/2007 | Hazama | F02M 37/50 |
| | | | 123/514 |
| 2007/0295005 A1 * | 12/2007 | Fleischmann | E02F 9/2285 |
| | | | 60/468 |
| 2013/0330205 A1 | 12/2013 | Apostolides et al. | |
| 2015/0308304 A1 | 10/2015 | Apostolides et al. | |

OTHER PUBLICATIONS

Eitel, Elisabeth, "The benefits of gearboxes—and when to pick integrated gearmotors", http://machinedesign.com/mechanical-drives/benefits-gearboxes-and-when-pick-integrated . . . , Apr. 10, 2013, 5 pages.

Vasilash, Gary S., "Of Water Pumps & Valve Trains: Automotive Design & Production", Automotive Design & Production, http://www.autofieldguide.com/articles/of-water-pumps-valve-trains, Feb. 24, 2012, 3 pages.

\* cited by examiner

SUPPLEMENTAL FILTRATION FOR MACHINE FLUID SYSTEMS

CROSS-REFERENCE TO RELATED APPLICATIONS

This application claims the benefit under 35 U.S.C. § 120 of the earlier filing date of U.S. Nonprovisional patent application Ser. No. 15/700,772 filed on Sep. 11, 2017, titled SUPPLEMENTAL FILTRATION FOR MACHINE FLUID SYSTEMS, now allowed, which claims the benefit under 35 U.S.C. § 120 of the earlier filing date of U.S. Nonprovisional patent application Ser. No. 13/492,234 filed on Jun. 8, 2012, titled SUPPLEMENTAL FILTRATION FOR MACHINE FLUID SYSTEMS, now U.S. Pat. No. 9,759,385, the content of each which are hereby incorporated by reference in their entirety.

BACKGROUND

Machines such as diesel engine systems used in connection with construction equipment, earth-moving equipment, transportation equipment (e.g., locomotives) and the like, are often implemented in adverse operating conditions. Typical operating conditions for such equipment can require extensive maintenance, repair, and overhaul work to sustain the equipment and its components, including the engine systems. As a consequence of these adverse equipment operating conditions, certain equipment components may be exhausted long before the expected end of their useful lives. Such component exhaustion can occur despite efforts to ensure proper component installation and maintenance, including periodic maintenance of equipment oil supply and lubrication systems, as well as other fluid systems.

Extensive and premature wear of large-capacity diesel engines, for example, can be caused by a combination of factors, including poor filtration and contamination of fluids, inadequate lubrication of components prior to engine ignition, failure to adhere to prescribed maintenance schedules, failure to collect and analyze data associated with equipment operation, system malfunction, general misuse of the equipment, and other factors. Downtime costs for processing fluid operations for heavy machinery and other machine fluid systems can be substantial. Accordingly, if downtime for maintenance in such machines can be minimized, then substantial economic benefits often result.

In view of the issues described above, improved strategies, techniques, methods, and systems are needed for processing and/or filtering the fluids employed in machine fluid systems.

DESCRIPTION

Figure 1:
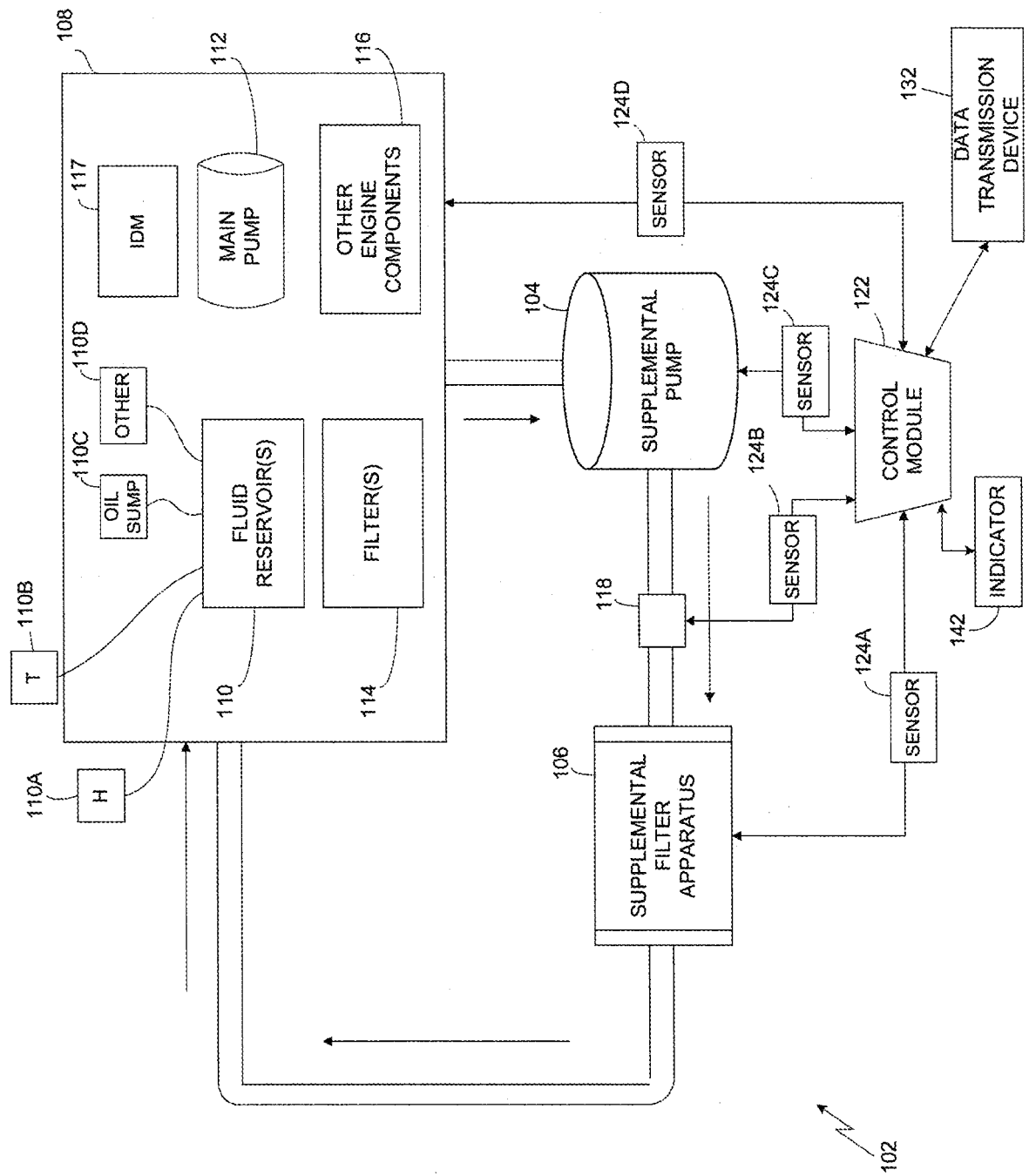
FIG. 1 schematically illustrates an example of a fluid filtration apparatus structured in accordance with various embodiments of the invention.

Various aspects of the invention reflect that the inventors have developed enhanced fluid filtration methods, system, and techniques that can leverage the function of a supplemental pump in conjunction with the existing components of a machine, such as the main pump of a machine with an engine, for example. In various embodiments, a supplemental filter apparatus may be operatively associated with the supplemental pump and/or a main pump of the machine to provide filtration of fluid flowing through the machine. The filtered fluid can then be returned to one or more fluid reservoirs of the machine through an appropriate fluid communication path. In addition, in certain embodiments a control module may be employed in operative association with the supplemental pump, one or more components of the machine, and/or a valve system or valve arrangement. The control module may be programmed to activate or deactivate the supplemental pump, for example, in association with detecting the existence of one or more kinds of filter triggering conditions. Such filter triggering conditions may be associated with a condition of the fluid (e.g., viscosity or the presence of contaminants), an operational state of one or more components the machine (e.g., engine speed or main pump pressure), occurrence of a predetermined event (e.g., a fixed time), and/or a variety of other potential triggering conditions or events. One or more sensors may be operatively associated with the control module to detect and to provide signals indicative of machine conditions or fluid conditions in connection with operation of the machine or the supplemental pump, for example. In various embodiments, operation of the supplemental pump may provide the function or effect of a "kidney loop" arrangement, as that term is understood by those skilled in the art of performing fluid processes or other maintenance on machines, including heavy machinery. In certain embodiments, a main pump of machine may operate independently and/or in conjunction with the supplemental pump to perform various kidney loop or other filtering operations as described in more detail herein.

The inventors have realized that machines that require filtered fluids often cannot effectively filter smaller particle sizes due to the fact that fine filtration media require either substantially high pressure across the filter, which can cause excessive parasitic power losses. Such fine filter media often require a substantial amount of installation space within the machine, which can cause unacceptably high filter manufacturing and disposal costs, and adds weight and size to the machine design. In addition, filter media may not allow through-flow sufficient to provide the fluid pressure needed to adequately lubricate the machine components. Therefore, equipment designers have usually compromised by using a coarse filter media that delivers adequate flow but only removes relatively larger particles from fluid. Also, certain equipment manufacturers have designed machines that direct a small amount of fluid flow through a fine filter media with the intent that most fluid in the machine will eventually pass through the fine filter. However, fine particles are constantly being created or introduced into the fluid system, and the particles are typically present in greater concentrations than desired. In certain situations, to maximize the pressure drop across the fine filter media, equipment designers have connected the outlet of the filter media to a low pressure zone (e.g., an engine sump). But since this fluid flow is not being supplied to the system needing lubrication, the main pump must be oversized to produce the excess flow. Various embodiments of the present invention can be structured to generate such excess flow only as needed to maintain a desired level of particle count, for example, or when the parasitic power required can be produced more efficiently. For example, by sending fluid flow from a prelubrication or refill process through a fine filter media, parasitic power required to filter the fluid can be reduced. In certain embodiments, fluid can be passed through the fine filter media during periods when the system would otherwise be decelerated by braking activity, for example, and embodiments of the invention can be structured to minimize the parasitic power required to filter this fluid. In addition, this additional load could be usefully applied to enhance the braking power of the machine.

The term "machine" as applied herein may include any equipment suitable for use in accordance with the present techniques, methods, and systems. Examples of "machines" as applied herein can include, without limitation, lubrication systems, engines, diesel engines, large-scale diesel engines, motors, rotating equipment, generators, aircraft engines, emergency machines, emergency generators, compressors, equipment that includes a machine (e.g., such as mining equipment, construction equipment, marine equipment, aircraft, etc.), and many other machines. As described in various portions of the present disclosure, the example of an "engine" is employed for convenience of disclosure in describing various embodiments and aspects of the present invention. It can be appreciated by those skilled in the art, however, that such use of "engine" as one example of a type of machine is intended merely for convenience of disclosure and is not necessarily intended to limit the scope of the invention.

Another example of a machine is a "fluid reservoir system" which may include any reasonable combination of fluid reservoirs, fluid components such as valves, pumps, and/or other components suitable for incorporation into a fluid reservoir system.

The term "evacuation" as applied to the systems and methods disclosed herein may include evacuation of any portion of a fluid of a machine, a receptacle, a reservoir, or other like fluid-retaining system or apparatus. Similarly, the term "refill" as applied to the systems and methods disclosed herein may include refill of any portion of the fluid capacity of a machine, receptacle, reservoir, or other like fluid-retaining system or apparatus.

The term "valve system" as applied to the systems and methods disclosed herein may include any combination of valves, pipes, disconnects, adapters and other like structural components configured for performing one or more fluid refill and/or fluid evacuation processes. Examples of valves included within a valve system may include, without limitation, single-position valves, multi-position valves (e.g., such as junction block assemblies or five-way control valves), mechanical valves, electronic valves, electro-mechanical valves, and/or other types of valves with or without electronic control for actuating the various possible open or closed positions of such valves.

Where suitable and applicable to the various embodiments of the present systems and methods discussed herein, it can be appreciated that various components, structures, elements, and other configurations may be applied or installed in a location considered external or internal to the operation of a particular machine. In applicable portions herein in which the use of pumps and/or supplemental pumps is disclosed, for example, such pumps may be positioned, installed, or operated as internal components of a machine and/or as externally positioned components that assist, or otherwise operate in conjunction with, the functions of the machine. For example, in certain embodiments a supplemental pump or other engine component may be considered "onboard" with respect to the machine.

As employed herein, the term "type" or "kind" used with regard to various fluids discussed herein is intended to distinguish different types or kinds of fluids between/among each other. For example, oil is considered one "type" of fluid, transmission fluid is considered another, different "type" of fluid, and hydraulic fluid is considered another, different "type" of fluid. It should be noted, for example, that a used amount of a "type" of fluid is not considered different with respect to a clean or fresh fluid of the same "type" (e.g., clean oil used in a fluid refill or replacement process for a machine is not considered a different "type" of fluid with respect to the used oil drained from the machine during a fluid evacuation process).

FIG. 1 schematically illustrates an example arrangement of a machine 102 operatively associated with a fluid filtration apparatus including a supplemental pump 104 and a supplemental filter apparatus 106 in accordance with various embodiments of the invention. As shown, the machine 102 may include an engine 108 comprising one or more fluid reservoirs 110 (e.g., hydraulic fluid reservoir 110A, transmission fluid reservoir 110B, oil sump 110C, or various other fluid reservoirs 110D). The engine 108 may also include a main pump 112 that performs primary fluid processing for the engine 108, such as pumping oil, air, or other fluids through the engine 108, for example. One or more filters 114 may be included in the engine, as well as potentially a variety of other engine components 116. In various embodiments, the supplemental filter apparatus 106 and/or the filters 114 may include one or more of an electrical filter, a magnetic filter, a centrifugal filter, a paper-based filter, or a synthetic filter. In certain embodiments, the supplemental pump 104 may be positioned onboard with respect to the machine 102 and/or the engine 108.

In various embodiments, the machine 102 may be structured with one or more fluid components 118. The fluid component 118 may include one or more of the following fluidic structures, for example and without limitation: a pump that is off-board with respect to the machine 102; a pump that is on-board with respect to the machine 102; a flow control means such as a hand-held device, for example; a bracket or evacuation bracket; and/or, a quick-disconnect structure. The fluid component 118 may also be one or more other types of components, devices, or systems suitable for supplying positive and/or negative fluid pressure to one or more fluid inlet ports or fluid outlet ports associated with the fluid component 118. For example, the fluid component 118 may be employed to perform one or more types of fluid evacuation processes and/or fluid refill processes (e.g., oil changes or other machine 102 maintenance operations) in association with different fluid reservoirs 110, for example, of the machine 102. It can be appreciated that the fluid component 118 may be positioned in one or more other places within the fluid system or valve system of the machine 102.

In various embodiments, a control module 122 may be operatively associated with the machine 102 to collect, process, and/or communicate data indicative of operational states, triggering conditions, machine 102 conditions, component functions, events, or other like data. For example, the control module 122 may be programmed to activate or deactivate the supplemental pump 104; to receive, transmit, and/or process data signals in communication with one or more components of the machine 102; and/or, to process or analyze data communicated from one or more sensors 124A-124D that can be operatively associated with various parts of the machine 102. For example, the sensor 124A may be configured to detect contaminants or other aspects of fluid composition associated with fluid flow passing through the supplemental filter apparatus 106. The control module 122 may include one or more processors or computer systems programmed with software, firmware, or other computer-executable instructions to perform the various functions of the control module 122. The control module 122 may be operatively associated with one or more data transmission devices 132 which may receive and/or store data received or processed by the control module 122. In certain embodiments, the control module 122 may communicate signals to one or more indicators 142 which reflect the activity or function of different aspects of the control module 122. For example, one such indicator 142 may include a warning light, or an alert graphical display positioned on the console of a vehicle in which the machine 102 is installed. In certain embodiments, the control module 122 may activate or deactivate a valve system or otherwise operate a valve or valve apparatus in connection with a filter triggering condition, for example.

Figure 1A:
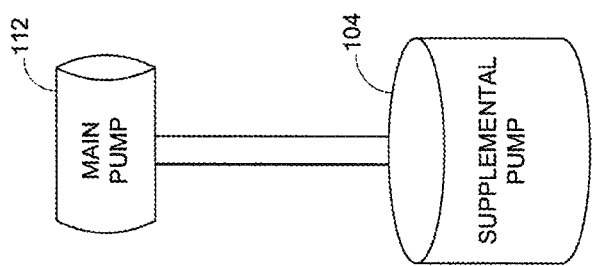
FIG. 1A schematically illustrates a supplemental pump connected for fluid communication with a main pump of a machine.

Referring again to FIG. 1, in the example shown, the machine 102 includes a fluid filtration apparatus comprising the supplemental pump 104 and the supplemental filter apparatus 106. The supplemental pump 104 may be connected for fluid communication with the main pump 112 of the engine 108. For example, FIG. 1A illustrates an arrangement in which the supplemental pump 104 is operatively connected for communicating fluid with the main pump 112. In certain embodiments, the supplemental pump 104 may be a pre-lubrication pump, for example, or an existing pump such as a component of a power steering system or a power braking system operatively associated with the machine 102. The supplemental pump 104 may be structured for fluid communication with at least one component of the engine 108, such as one or more of the fluid reservoirs 110. The supplemental filter apparatus 106 may be positioned in fluidic series with the supplemental pump 104 and structured with an inlet for receiving fluid flow from the supplemental pump 104. The supplemental filter apparatus 106 may be structured with an outlet to direct the fluid flow to one or more of the fluid reservoirs 110, or other components, of the engine 108. From the outlet or discharge side of the supplemental filter apparatus 106, fluid may be directed to flow to a primary oil filter 114 of the engine 108, for example. In various embodiments, the supplemental filter apparatus 106 may include at least one fine filtration medium. In certain embodiments, one of the filters 114 of the engine 108 may be positioned between the outlet of the supplemental filter apparatus 106 and one or more of the fluid reservoirs 110 of the engine 108.

In various embodiments, the control module 122 may be programmed to perform one or more functions upon detecting the existence of various filter triggering conditions or other events. Likewise, the control module 122 may be programmed to perform one or more functions when a filter triggering condition is no longer detected, is out of a predefined parameter range (e.g., 10% above or 10% below a predefined engine speed), or otherwise no longer exists as a triggering condition. For example, the control module 122 may be programmed to activate or deactivate the supplemental pump 104 in association with detecting the existence of a filter triggering condition. Examples of potential filter triggering conditions may include a combination of one or more of the following: threshold fluid temperature, threshold fluid pressure, threshold engine speed, threshold fluid contaminant level, filter condition, threshold time duration of operation, an injection timing variable, a fuel consumption value, a predetermined day or time, machine state of operation. For example, supplemental filtration can be activated as a function of oil condition, engine 108 hours, mileage, fuel consumption, and/or engine 108 component speed (e.g., as measured in revolutions per minute (RPM)). In certain embodiments, engine 108 hours may mean total time of operation, such as operation time between two or more defined points in time, or time between fluid operations such as oil changes performed on the engine 108.

In another example, fluid condition monitoring may be performed to detect a filter triggering condition, such as particle count, particle accumulation, oxidation level, and/or fluid dilution level. In various embodiments, a contaminant sensor may be configured to detect soot levels, for example, or the presence of other contaminants in a fluid flowing through the machine 102. For example, a filter triggering condition may be employed that corresponds with a maximum soot level that is acceptable for desired or optimum engine 108 operation, which may be specified by an original equipment manufacturer or by other engineering specifications. The control module 122 may be programmed to activate the supplemental filter apparatus 106 upon reaching the predetermined soot level for the specifications of a given engine 108. In another example, the supplemental filter apparatus 106 may function to remove a dilutant such as water, for example, from oil or fuel employed by the machine 102.

In various embodiments, a filter triggering condition may involve a deviation from a predetermined range for an engine 108 idle speed, a turbo boost pressure, a fuel consumption rate, a waste gate function, or an injection rate, for example. In addition, calculated values such a fuel-to-air ratio can be considered at least part of a filter triggering condition. For example, clogging an air filter in the engine 108 can cause a change in the fuel-to-air ratio, in addition to potentially causing the fuel to increase its soot level. Other factors related to combustion chemistry, or other phenomena that impact quality of combustion, may also form the basis for defining a filter triggering condition.

The inventors have recognized that arrangements such as the one illustrated in FIG. 1 can provide more than a partial bypass for the machine 102. In one embodiment, the fluid filtration apparatus may be employed to draw fluid flow from a reservoir or oil sump of the engine 108, for example, and divert more than 15 percent of the oil flow through the engine 108 through a two to five micron supplemental filter apparatus 106 using the main pump 112 of the engine 108. In various embodiments, the filter apparatus provides full flow from the engine 108 through the supplemental filter apparatus 106 by using the supplemental pump 104.

Figure 2:
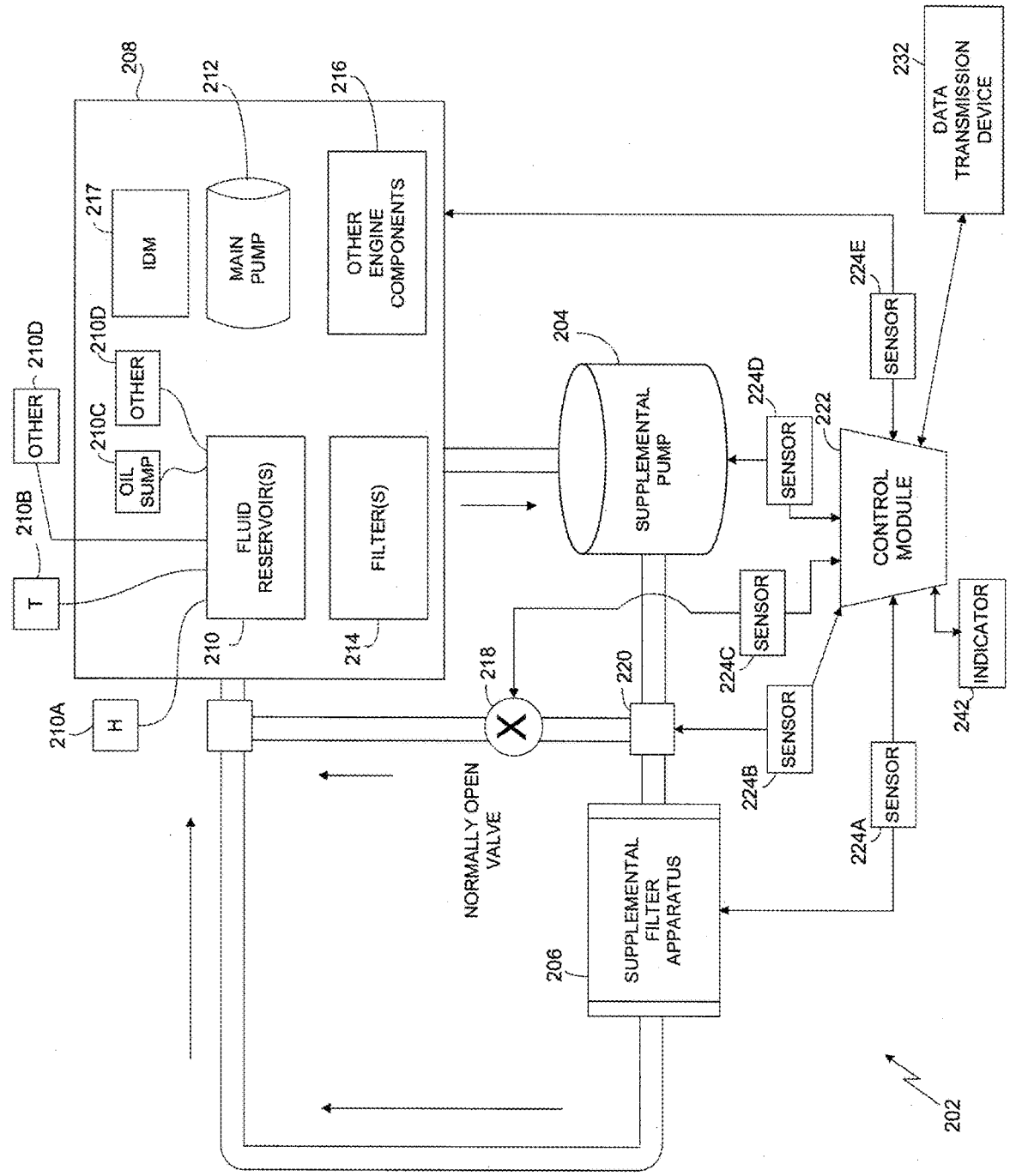
FIG. 2 schematically illustrates an example of a fluid filtration apparatus structured in accordance with various embodiments of the invention.

FIG. 2 schematically illustrates another example of a fluid filtration apparatus structured for operation in a machine 202 in accordance with various embodiments of the invention. The fluid filtration apparatus includes a supplemental pump 204 structured for fluid communication with a supplemental filter apparatus 206 and at least one component of an engine 208. The engine 208 may include multiple fluid reservoirs 210 having different types of fluids (e.g., hydraulic fluid reservoir 210A, transmission fluid reservoir 210B, oil sump 210C, or various other fluid reservoirs). The engine 208 may also include a main pump 212 that performs primary fluid processing for the engine 208, such as pumping oil, air, or other fluids through the engine 208, for example. One or more filters 214 may be included in the engine 208, as well as potentially a variety of other engine components 216. In various embodiments, the supplemental filter apparatus 206 and/or the filters 214 may include one or more of an electrical filter, a magnetic filter, a centrifugal filter, a paper-based filter, or a synthetic filter. In certain embodiments, the supplemental pump 204 may be positioned onboard with respect to the machine 202 and/or the engine 208.

As shown, the inlet of the supplemental filter apparatus 206 may be connected to the outlet of the supplemental pump 204. A valve apparatus 218 may be provided with an inlet connected at a common junction between an outlet of the supplemental pump 204 and an inlet of the supplemental filter apparatus 206. The outlet of the valve apparatus 218 may also be connected at a common junction of an outlet of the supplemental filter apparatus 206 and one or more components of the engine 108, such as one or more of the fluid reservoirs 210A-210D. In various embodiments, the valve apparatus 218 may include a normally open valve, for example.

In various embodiments, a control module 222 may be programmed to actuate at least one of the normally open valve in the valve apparatus 218 or to activate the supplemental pump 204 in association with detecting a filter triggering condition (including filter triggering conditions described in other places herein). Likewise, the control module 222 may be programmed to activate or deactivate the supplemental pump 204 as appropriate in accordance with various filter triggering conditions. For example, the control module 222 may be programmed to activate at least one of the normally open valve in the valve apparatus 218 or to activate the supplemental pump 204 at a predetermined time during operation of the machine 202. In certain embodiments, the control module 222 may be programmed to activate or deactivate the supplemental pump 204; to receive, transmit, and/or process data signals in communication with one or more components of the machine 202; and/or, to process or analyze data communicated from one or more sensors 224A-224E as operatively associated with various parts of the machine 202. For example, the sensor 224A may be configured to detect contaminants or other aspects of fluid composition associated with fluid flow passing through the supplemental filter apparatus 206.

The control module 222 may include one or more processors or computer systems programmed with software, firmware, or other computer-executable instructions to perform the various functions of the control module 222. The control module 222 may be operatively associated with one or more data transmission devices 232 which can store and/or process data received or processed by the control module 222. In certain embodiments, the control module 222 may communicate signals to one or more indicators 242 which reflect the activity or function of different aspects of the control module 222. For example, one such indicator 242 may include a warning light, or an alert graphical display positioned on the console of a vehicle in which the machine 202 is installed. In certain embodiments, the control module 222 may activate or deactivate a filter system or otherwise operate a valve or valve apparatus in connection with a filter triggering condition. For example, the control module 222 may be programmed to actuate the normally open valve of the valve apparatus 218 to employ or to bypass the supplemental filter apparatus 206 under appropriate circumstances or in association with a detected filter triggering condition.

It can be seen that the arrangement illustrated in FIG. 2 can be embodied as a filtration system (as supplied in part by the supplemental filter apparatus 206) in parallel with a prelubrication system (as supplied in part by the supplemental pump 204). The normally open valve of the valve apparatus 218 may represent a usual primary flow of fluid through the supplemental pump 204 back to the engine 208. In one operating state, the normally open valve of the valve apparatus 218 can be closed to direct a primary fluid flow through the supplemental filter apparatus 206. In another operating state, the normally open valve of the valve apparatus 218 can be opened to direct the primary fluid flow away from the supplemental filter apparatus 206 and back to the engine 208. It can be seen that the filtration system of FIG. 2 can be useful in the event that a fine filter associated with the supplemental filter apparatus 206 becomes too restrictive, which might result from a clogged filter, for example. In one example, a filter triggering condition may result in opening the normally open valve of the valve apparatus 218 when an oil temperature is below a threshold temperature and when a flow rate through the supplemental filter apparatus 206 is below a threshold rate. In another example, the filter triggering condition which results in actuating the valve apparatus 218 may detect a threshold fluid pressure at various points within the machine 202. In another example, supplemental filtration by the supplemental filter apparatus 206 may be engaged based on condition monitoring of the fluid to regulate when and how long the supplemental pump 204 is activated.

In certain embodiments, a filter triggering condition can be logged by the control module 222 as a fault condition, such as when fluid pressure is too high at the supplemental filter apparatus 206 perhaps indicating that the filter medium needs to be cleaned or changed. In addition, a filter triggering condition may be accompanied by activating or deactivating an indicator 242 in connection with the filter triggering condition. For example, a high fluid pressure filter triggering condition may cause an indicator 242 in the operator area of the machine 208 to activate, signaling to the operator that the filter medium of the supplemental filter apparatus 206 needs to be changed.

The inventors have recognized that there are advantages in determining whether to use the supplemental pump 204 to direct fluid flow through a filter 214 of the engine 208 or directly to an appropriate fluid reservoir 210. For example, fluid that has passed through the supplemental filter apparatus 206 may be sufficiently clean so as not to require further filtering through a filter 214 of the engine 208. In another example, directing fluid flow with the supplemental pump 204 from the supplemental filter apparatus 206 into a filter 214, oil rifle, and bearings of the engine 208 can boost oil pressure. Such a boost in oil pressure may be useful at times when the engine 208 is idling, for example, or during other states of machine 202 operation when a boost in oil pressure or other fluid pressure is required. It can be seen that this arrangement can boost engine oil pressure while lowering the power required by the engine 208. In other words, one of the problems identified by the inventors is that typically the oil pump on the engine 208 has to be oversized in order to deliver sufficient lubrication during engine 208 idle. Accordingly, the oil pump is often oversized to deliver appropriate pressure at engine 208 idle speed, even though such an oil pump is larger than it has to be to deliver pressure at comparatively higher engine 208 speeds achieved during machine 202 operation. In various embodiments, use of the filtration system including the supplemental pump 204 can serve as a way to downsize the flow range of the engine pump 212.

In various embodiments, the control module 222 may be programmed to activate the supplemental pump 204 and direct fluid flow back to the to the filter 114 to allow for using a smaller engine primary oil pump and/or reduce the duty cycle needed from certain engine 208 components. This arrangement has the potential to provide supplemental fluid flow at low engine speeds 208 in a way that can allow engine 208 manufacturers to reduce the flow rate and thus reduce parasitic loading on the main pump 212. Likewise, the control module 222 may be programmed to decide when to deactivate the supplemental pump 204. For example, deactivating the supplemental pump 204 may be performed in response to analyzing a combination of one or more factors such as engine 208 speed (e.g., within a tolerance range at idle speed, full speed, or other operational speeds), engine oil rifle pressure, or fluid temperature. For example, an oil regulator may be disabled if the oil is too thick (i.e., viscosity), and the engine 208 may then run on the high pressure supplied by the supplemental pump 204 to raise the rifle pressure.

In various embodiments, the machine 202 may be structured with one or more fluid components 220. The fluid component 220 may include one or more of the following fluidic structures, for example and without limitation: a pump that is off-board with respect to the machine 202; a pump that is on-board with respect to the machine 202; a flow control means such as a hand-held device, for example; a bracket or evacuation bracket; and/or, a quick-disconnect structure. The fluid component 220 may also be one or more other types of components, devices, or systems suitable for supplying positive and/or negative fluid pressure to one or more fluid inlet ports or fluid outlet ports associated with the fluid component 220. For example, the fluid component 220 may be employed to perform one or more types of fluid evacuation processes and/or fluid refill processes (e.g., oil changes or other machine 202 maintenance operations) in association with different fluid reservoirs 210, for example, of the machine 202. It can be appreciated that the fluid component 220 may be positioned in one or more other places within the fluid system or valve system of the machine 202.

Figure 3A:
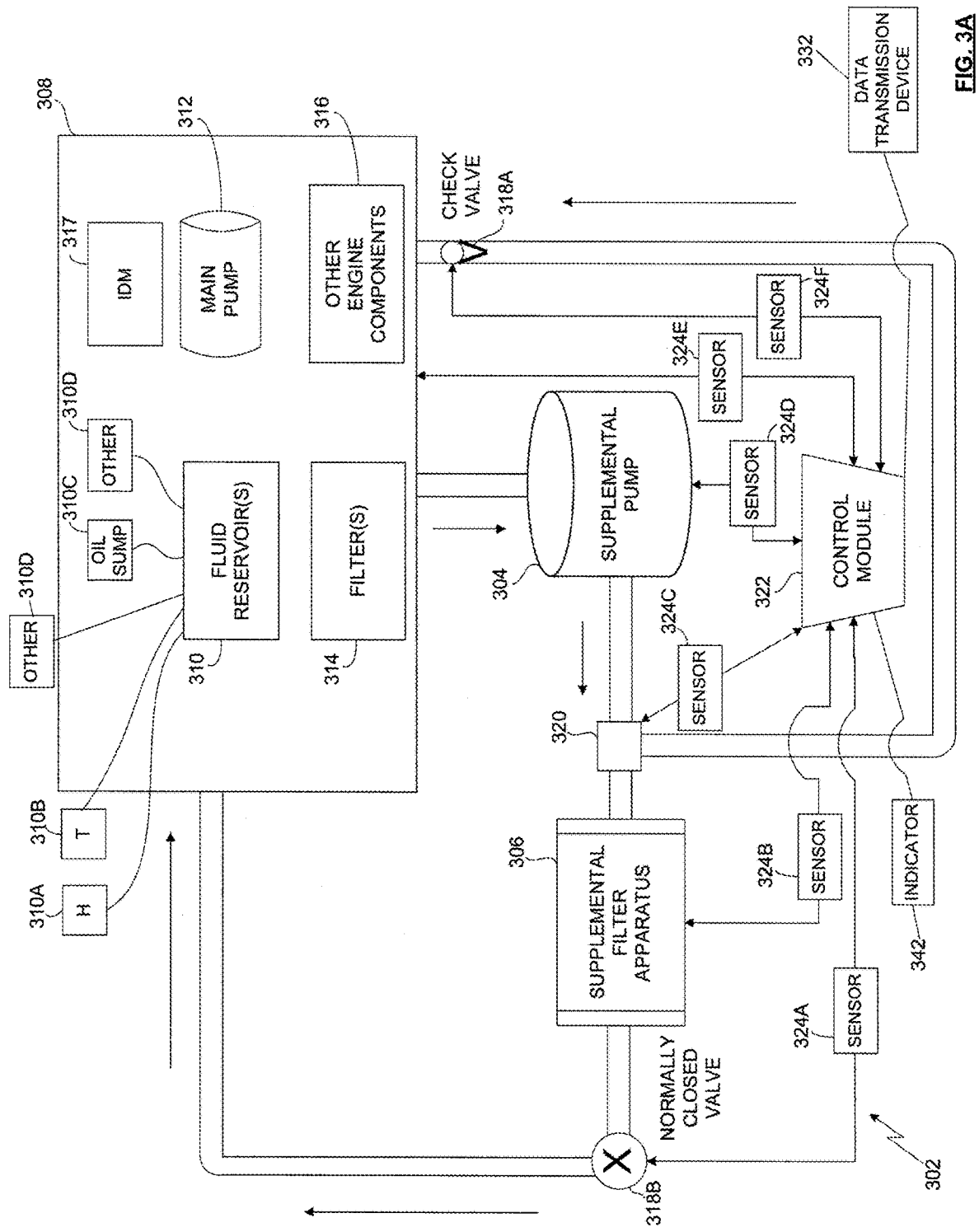
FIGS. 3A and 3B schematically illustrate alternative embodiments of an example of a fluid filtration apparatus structured in accordance with various embodiments of the invention.

FIG. 3A schematically illustrates an example arrangement of a machine 302 operatively associated with a supplemental pump 304 and a supplemental filter apparatus 306 in accordance with various embodiments of the invention. As shown, the machine 302 may include an engine 308 comprising one or more fluid reservoirs 310 (e.g., hydraulic fluid reservoir 310A, transmission fluid reservoir 310B, oil sump 310C, or various other fluid reservoirs 310D). The engine 308 may also include a main pump 312 that performs primary fluid processing for the engine 308, such as pumping oil, air, or other fluids through the engine 308, for example. One or more filters 314 may be included in the engine, as well as potentially a variety of other engine components 316. In various embodiments, a fluid filtration apparatus may comprise the supplemental filter apparatus 306 having an inlet connected at a common junction of an outlet of the supplemental pump 304 and an inlet of a first valve 318A. The first valve 318A may be connected to facilitate fluid flow to the engine 308 at a threshold level of fluid pressure. A second valve 318B may be positioned between an outlet of the supplemental filter apparatus 306 and an inlet of at least one component of the engine 308. In certain embodiments, the supplemental pump 304 may be positioned onboard with respect to the machine 302 and/or the engine 308.

In certain embodiments, a control module 322 may be programmed for actuating at least one of the first valve 318A, the second valve 318B, or the supplemental pump 304 in association with detecting the existence of a filter triggering condition. For example, activating and/or deactivating the supplemental pump 304 may be performed in response to analyzing a combination of one or more factors such as engine 308 speed (e.g., within a tolerance range at idle speed, full speed, or other operational speeds), engine oil rifle pressure, or fluid temperature. For example, an oil regulator may be disabled if the oil is too thick (i.e., viscosity), and the engine 308 may then run on the high pressure supplied by the supplemental pump 304 to raise the rifle pressure. Likewise, the control module 322 may be programmed to deactivate the supplemental pump 304 as appropriate in accordance with various filter triggering conditions. The control module 322 may include one or more processors or computer systems programmed with software, firmware, or other computer-executable instructions to perform the various functions of the control module 322. The control module 322 may be operatively associated with one or more data transmission devices 332 which can store and/or process data received or processed by the control module 322. The control module 322 may be programmed to activate or deactivate the supplemental pump 304; to receive, transmit, and/or process data signals in communication with one or more components of the machine 302; and/or, to process or analyze data communicated from one or more sensors 324A-324E as operatively associated with various parts of the machine 202. In certain embodiments, the control module 322 may communicate signals to one or more indicators 342 which reflect the activity or function of different aspects of the control module 322. For example, one such indicator 342 may include a warning light, or an alert graphical display positioned on the console of a vehicle in which the machine 302 is installed. In certain embodiments, the control module 322 may activate or deactivate a filter system or otherwise operate a valve or valve apparatus in connection with a filter triggering condition.

In the example of a fluid filtration apparatus shown in FIG. 3A, the second valve 318B may include a normally closed valve to resist fluid flow through the supplemental filter apparatus 306 in a first operating mode. In this first operating mode, fluid flows through the supplemental pump 304, through the first valve 318A, and then back to a component of the engine 308. In various embodiments, the first valve 318A may include a check valve which is connected to a filter head 314 of the engine 308, for example. In certain embodiments, the second valve 318B may be connected to a sump of the engine 308. In the first operating mode when the second valve 318B is closed, then fluid may flow through the supplemental pump 304 to the filter 314, such as during a pre-lubrication fluid process, for example. In a second operating mode, the second valve 318B may be opened to enable bypass filtration of the fluid flow through the supplemental filter apparatus 306 and back to the sump 310C of the engine 308, or another fluid reservoir 310. It can be seen that back pressure through the filter 314 during engine operation can resist fluid from flowing through the first valve 318A. In the event that restriction of fluid flow by the supplemental filter apparatus 306 restriction results in unacceptably high pressure, then the first valve 318A can be actuated to allow fluid flow through the engine 308 through the filter 314. In other words, when the second valve 318B is open, the part of the fluid path that leads to the engine 308 through the first valve 318A and the filter head 314 is also open. For example, if the supplemental filter apparatus 306 includes a two micron filter medium, and the filter medium becomes clogged during use, then a pressure greater than pressure at the filter 314 would allow fluid to flow into the filter 314, thus potentially limiting pressure at the supplemental filter apparatus 306 to just slightly more than the engine 308 fluid pressure at filter 314.

In various embodiments, the machine 302 may be structured with one or more fluid components 320. The fluid component 320 may include one or more of the following fluidic structures, for example and without limitation: a pump that is off-board with respect to the machine 302; a pump that is on-board with respect to the machine 302; a flow control means such as a hand-held device, for example; a bracket or evacuation bracket; and/or, a quick-disconnect structure. The fluid component 320 may also be one or more other types of components, devices, or systems suitable for supplying positive and/or negative fluid pressure to one or more fluid inlet ports or fluid outlet ports associated with the fluid component 320. For example, the fluid component 320 may be employed to perform one or more types of fluid evacuation processes and/or fluid refill processes (e.g., oil changes or other machine 302 maintenance operations) in association with different fluid reservoirs 310, for example, of the machine 302. It can be appreciated that the fluid component 320 may be positioned in one or more other places within the fluid or valve system of the machine 302.

Figure 3B:
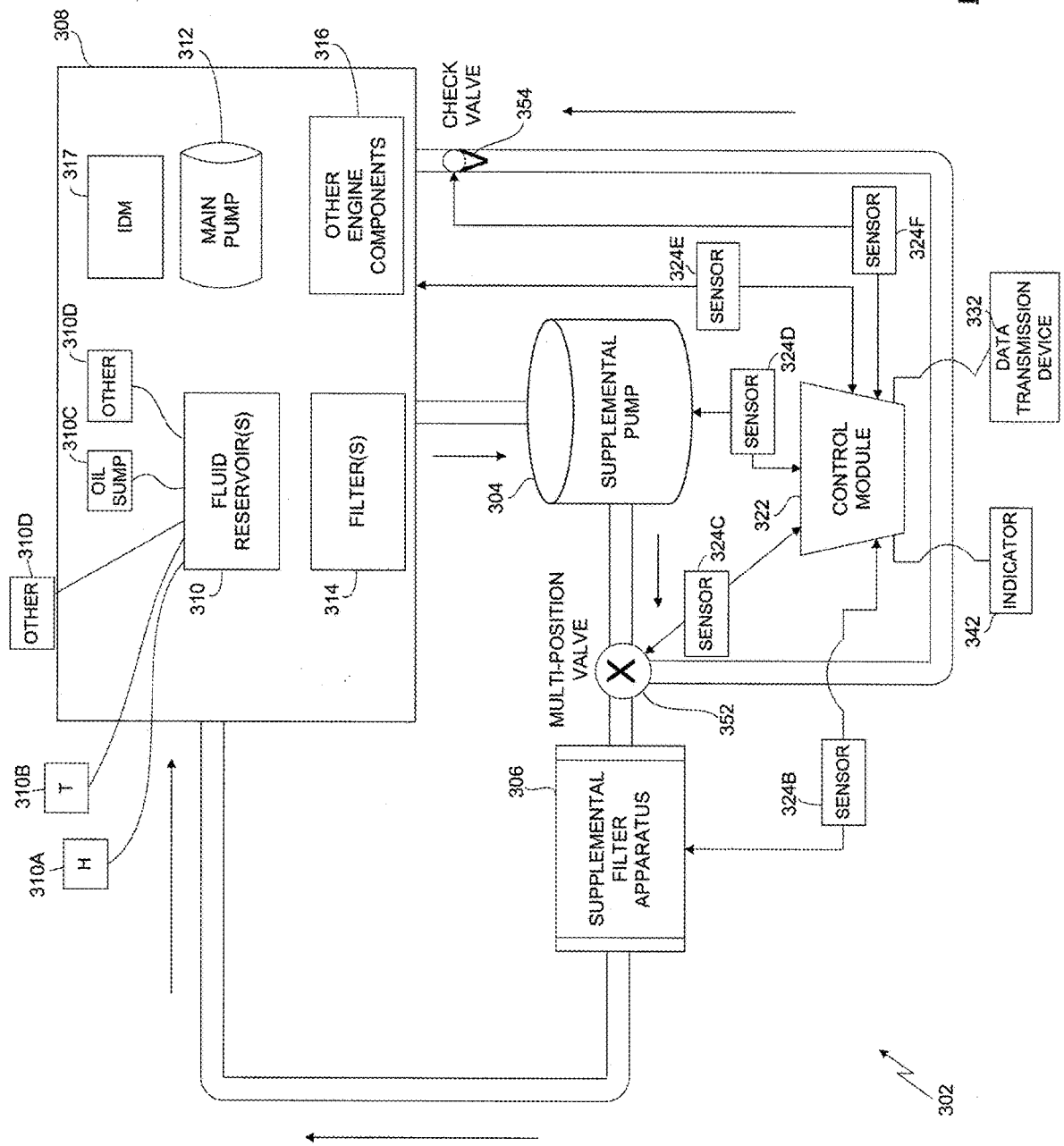

FIG. 3B illustrates an alternative embodiment of the fluid filtration apparatus shown in FIG. 3A. In this embodiment, a multi-position valve 352 may be located at a common junction of: an inlet of the supplemental filter apparatus 306; an outlet of the supplemental pump 304; and, an inlet of a second valve 354 operatively associated with the engine 308. In addition, an outlet of the supplemental filter apparatus 306 may be in fluid communication with a fluid reservoir 310 or another component of the engine 308. The multi-position valve 352 may be structured for being alternatively positioned: in a first operating state in which a fluid path is established from the outlet of the supplemental pump 304 to the inlet of the second valve 354; or in a second operating state in which a fluid path is established from the outlet of the supplemental pump 304, through the inlet of the supplemental filter apparatus 306, and to the fluid reservoir 310 or another component of the engine 308. The control module 322 may be configured to process or communicate signals in connection with operation of the multi-position valve 352 and/or a sensor 324C operatively associated with the multi-position valve 352.

Figure 4:
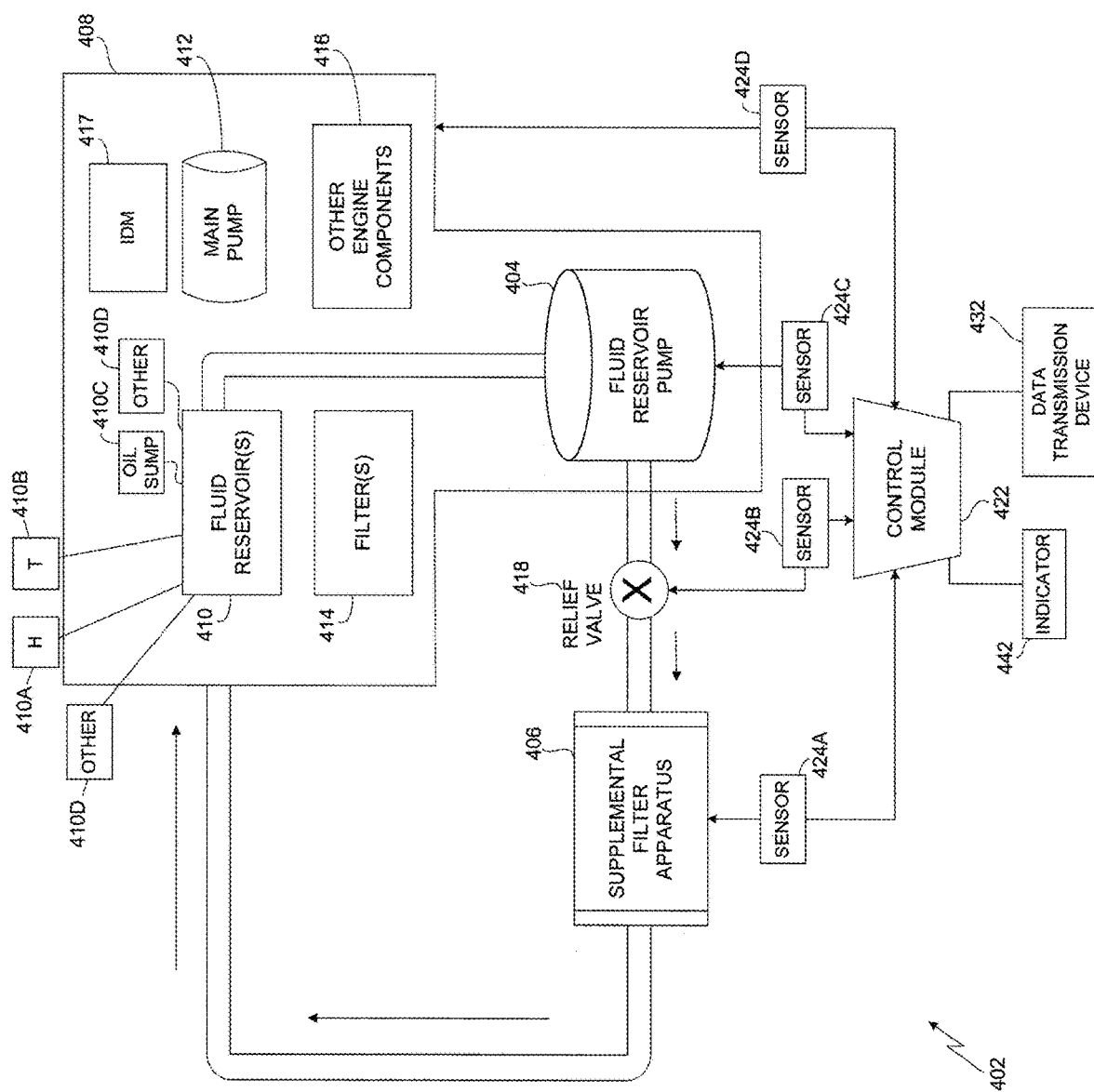
FIG. 4 schematically illustrates an example of a fluid filtration apparatus structured in accordance with various embodiments of the invention.

FIG. 4 schematically illustrates an example arrangement of a machine 402 operatively associated with a fluid filtration apparatus including a fluid reservoir pump 404 and a supplemental filter apparatus 406 in accordance with various embodiments of the invention. As shown, the fluid reservoir pump 404 may be connected to at least one fluid reservoir 410 of an engine 408. The machine 402 may include an engine 408 comprising one or more fluid reservoirs 410 (e.g., hydraulic fluid reservoir 410A, transmission fluid reservoir 410B, oil sump 410C, or various other fluid reservoirs 410D). The engine 408 may also include a main pump 412 that performs primary fluid processing for the engine 408, such as pumping oil, air, or other fluids through the engine 408, for example. One or more filters 414 may be included in the engine, as well as potentially a variety of other engine components 416. In various embodiments, the supplemental filter apparatus 406 and/or the filters 414 may include one or more of an electrical filter, a magnetic filter, a centrifugal filter, a paper-based filter, or a synthetic filter. In certain embodiments, the fluid reservoir pump 404 may be positioned onboard with respect to the machine 402 and/or the engine 408.

In certain embodiments, the fluid reservoir pump 404 may be a pre-lubrication pump, for example, or an existing pump which is a component of a power steering system or a power braking system operatively associated with the machine 402. The supplemental pump 404 may be structured for fluid communication with at least one component of the engine 408, such as one or more of the fluid reservoirs 410. The supplemental filter apparatus 406 may be positioned in fluidic series with the supplemental pump 404 and structured with an inlet for receiving fluid flow from the supplemental pump 404. The supplemental filter apparatus 406 may be structured with an outlet to direct the fluid flow to one or more of the fluid reservoirs 410 of the engine 408. From the outlet or discharge side of the supplemental filter apparatus 406, fluid may be directed to flow to a primary air filter 414 of the engine 408, for example. In various embodiments, the supplemental filter apparatus 406 may include at least one fine filtration medium. In certain embodiments, one of the filters 414 of the engine 408 may be positioned between the outlet of the supplemental filter apparatus 406 and one or more of the fluid reservoirs 410 of the engine 408.

In various embodiments, the supplemental filter apparatus 406 may be connected to the fluid reservoir pump 404, which may be a pump operatively associated with the oil sump 410C, for example. In certain embodiments, a relief valve 418 may be connected for fluid communication between the supplemental filter apparatus 406 and the fluid reservoir pump 404. The relief valve 418 may be structured to direct fluid flow from the fluid reservoir pump 404 to the supplemental filter apparatus 406 in association with a filter triggering condition associated with the relief valve 418, for example. In various embodiments, the relief valve 418 may be structured to resist diverting flow from an oil rifle and bearings of the engine 408, for example, until the engine 408 experiences excess flow. In certain embodiments, the relief valve 418 may be regulated by pressure, temperature, fluid viscosity, flow of fluid reservoir pump 404 (e.g., engine oil pump), and/or other conditions. In one embodiment, the relief valve 418 may be activated when excess flow exists beyond an amount flow that is necessary for the engine 408 to perform at a predetermined level of operation. As shown in FIG. 4, excess flow can be passed through the relief valve 418 to the supplemental filter apparatus 406 as a bypass for performing fine filtration.

In various embodiments, it can be seen that operation of the engine 408 can be optimized to use substantially the correct amount of fluid needed by the engine 408, and excess flow can be directed to a bypass or filtration process. For example, if oil rifle pressure in the engine 408 is 23 psi and the engine 408 speed is at 900 rpm, then the engine 408 may begin dumping at least part of its excess oil through an oil regulator. As the engine 408 speed ramps up the rpm curve, more flow than needed may be added to the system. At this stage, the rifle pressure may be 32 psi, for example, when the engine 408 begins to dump the excess oil. Next, in this example, suppose that the engine 408 achieves a rated speed of 1800 to 2100 rpm, while rifle pressure had risen from 32 psi to 35 psi, while potentially dumping 23 gallons per minute through the oil regulator. In this example, it can be seen that at least some portion of the dumped oil can be directed through the supplemental filter apparatus 406 instead of being wasted. In certain embodiments, the filter triggering condition associated with activation or deactivation of the relief valve 418 may or may not be set at a level that results in a decrease in the rifle pressure within the engine 408.

In various embodiments, the machine 402 may be structured with one or more fluid components in operative association with the relief valve 418. The fluid component may include one or more of the following fluidic structures, for example and without limitation: a pump that is off-board with respect to the machine 402; a pump that is on-board with respect to the machine 402; a flow control means such as a hand-held device, for example; a bracket or evacuation bracket; and/or, a quick-disconnect structure. The fluid component may also be one or more other types of components, devices, or systems suitable for supplying positive and/or negative fluid pressure to one or more fluid inlet ports or fluid outlet ports associated with the fluid component. For example, the fluid component may be employed to perform one or more types of fluid evacuation processes and/or fluid refill processes (e.g., oil changes or other machine 402 maintenance operations) in association with different fluid reservoirs 410, for example, of the machine 402. It can be appreciated that the fluid component may be positioned in one or more other places within the fluid or valve system of the machine 402.

In various embodiments, a control module 422 may be operatively associated with the machine 402 to collect, process, and/or communicate data indicative of operational states, triggering conditions, machine 402 conditions, component functions, events, or other like data. For example, the control module 422 may be programmed to activate or deactivate the fluid reservoir pump 404; to receive, transmit, and/or process data signals in communication with one or more components of the machine 402; and/or, to process or analyze data communicated from one or more sensors 424A-424D that may be operatively associated with various parts of the machine 402. For example, the sensor 424A may be configured to detect contaminants or other aspects of fluid composition associated with fluid flow passing through the supplemental filter apparatus 406. The control module 422 may include one or more processors or computer systems programmed with software, firmware, or other computer-executable instructions to perform the various functions of the control module 422. The control module 422 may be operatively associated with one or more data transmission devices 132 which can store and/or process data received or processed by the control module 422. In certain embodiments, the control module 422 may communicate signals to one or more indicators 442 which reflect the activity or function of different aspects of the control module 422. For example, one such indicator 442 may include a warning light, or an alert graphical display positioned on the console of a vehicle in which the machine 402 is installed. In certain embodiments, the control module 422 may activate or deactivate a valve system or otherwise operate a valve or valve apparatus in connection with a filter triggering condition, for example.

In various embodiments, the control module 422 may be programmed to perform one or more functions upon detecting the existence of various filter triggering conditions or other events. Likewise, the control module 422 may be programmed to perform one or more functions when a filter triggering condition is no longer detected, is out of a predefined parameter range (e.g., 10% above or 10% below a predefined engine speed), or otherwise no longer exists as a triggering condition. For example, the control module 422 may be programmed to activate the fluid reservoir pump 404 in association with detecting the existence of a filter triggering condition. Examples of potential filter triggering conditions may include a combination of one or more of the following: threshold fluid temperature, threshold fluid pressure, threshold engine speed, threshold fluid contaminant level, filter condition, threshold time duration of operation, an injection timing variable, a fuel consumption value, a predetermined day or time, machine state of operation. For example, supplemental filtration can be activated as a function of oil condition, engine 408 hours, or engine 408 component speed as measured in RPM or another suitable measurement. In certain embodiments, engine 408 hours may mean total time of operation, such as operation time between two or more defined points in time, or time between fluid operations such as oil changes performed on the engine 408.

In another example, fluid condition monitoring may be performed to detect a filter triggering condition, such as particle count, particle accumulation, and/or fluid dilution level. In various embodiments, a contaminant sensor may be configured to detect soot levels, for example, or the presence of other contaminants in a fluid flowing through the machine 402. For example, a filter triggering condition may be employed that corresponds with a maximum soot level that is acceptable for desired or optimum engine 408 operation, which may be specified by an original equipment manufacturer or by other engineering specifications. The control module 422 may be programmed to activate the supplemental filter apparatus 406 upon reaching the predetermined soot level for the specifications of a given engine 408. In another example, the supplemental filter apparatus 406 may function to remove a dilutant such as water, for example, from oil or fuel employed by the machine 402.

In various embodiments, a filter triggering condition may involve a deviation from a predetermined range for an engine 408 idle speed, a turbo boost pressure, a fuel consumption rate, a waste gate function, or an injection rate, for example. In addition calculated values such a fuel-to-air ratio can be considered at least part of a filter triggering condition. For example, clogging an air filter in the engine 408 can cause a change in the fuel-to-air ratio, in addition to potentially causing the fuel to increase its soot level. Other factors related to combustion chemistry, or other phenomena that impact quality of combustion, may also form the basis for defining a filter triggering condition.

Figure 5:
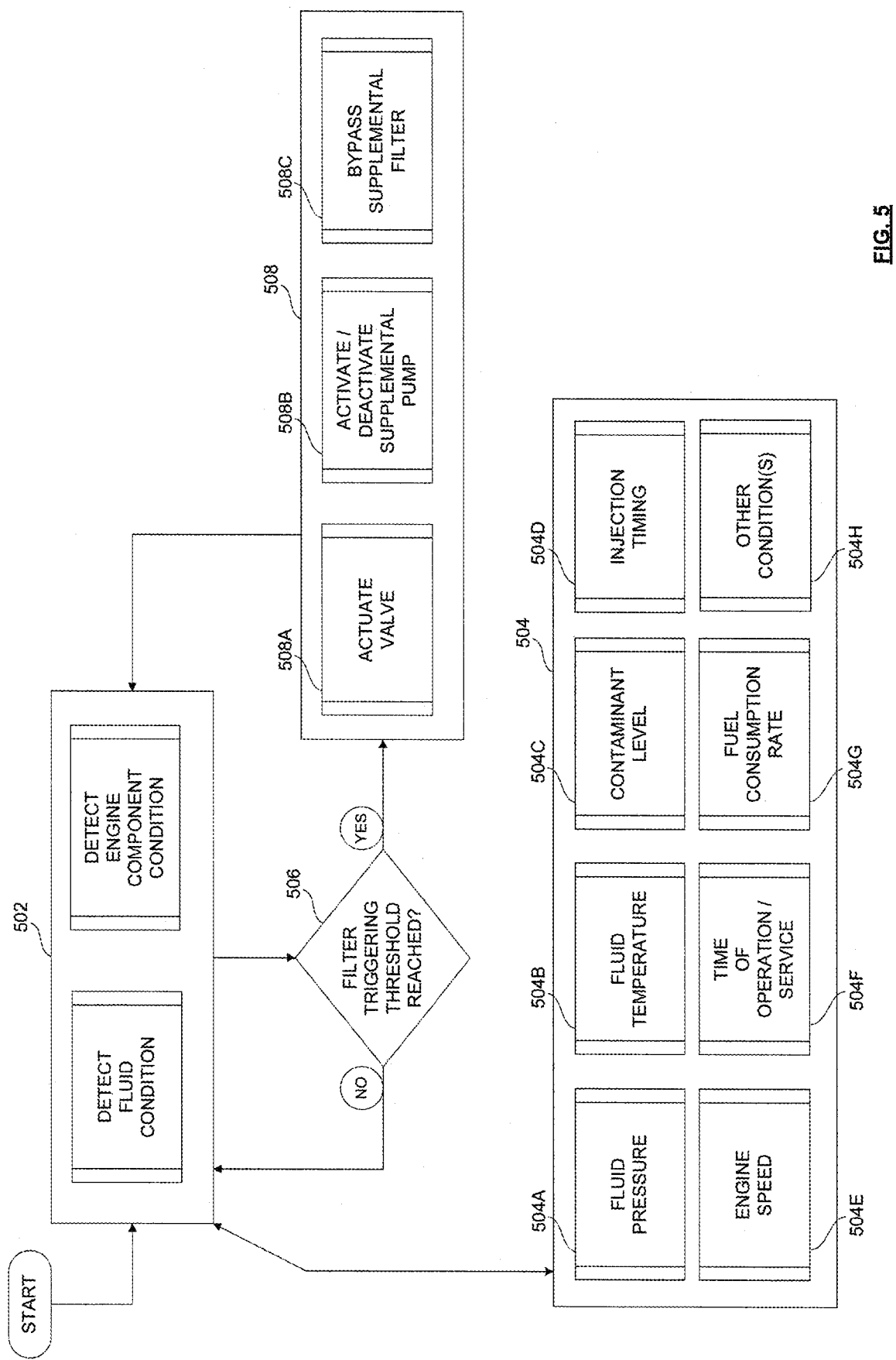
FIG. 5 includes a process flow diagram illustrating an example of processing various filter triggering conditions in accordance with certain embodiments of the invention.

FIG. 5 includes an example of a process flow illustrating aspects of detecting and identifying filter triggering conditions in accordance with various embodiments of the invention. At step 502, a fluid condition or an engine component condition may be detected, for example, such as by the function of one or more of the control modules or sensors described herein. As shown, examples of fluid and component conditions 504 include fluid pressure 504A, fluid temperature 504B, contaminant level 504C, injection timing 504D, engine speed 504E, time of operation or service 504F, fuel consumption rate 504G, or many other conditions 504H (including the various filter triggering conditions described herein). At step 506, a control module or other device may determine whether a filter triggering threshold has been reached (e.g., whether the fluid temperature has fallen below or risen above a predetermined threshold). If the predetermined threshold has been reached, then the system may perform an action 508 such as actuating a valve 508A, activating or deactivating a supplemental pump 508B or the main pump of a machine, bypassing a supplemental filter 508C, and/or take other actions as may be appropriate under the circumstances, such as performing a kidney loop or fluid filtration process, for example. In one example, the supplemental pump may be activated to perform a kidney loop operation during braking or deceleration of the machine, or otherwise when the engine speed 504E of the machine is reduced.

In various embodiments, the control modules described herein may include various components for controlling and monitoring a fluid system, as well as for monitoring, collecting and analyzing data associated with various fluid system and method embodiments described herein. The control module may include a processor for executing various commands within, and directing the function of, the various components of the control module. One or more sensor inputs can be provided in the control module for receiving and processing data communicated from one or more sensors installed within a fluid system. Sensors applicable to operation of a machine can include, without limitation, sensors to detect temperature, sensors to detect pressure, sensors to detect voltage, sensors to detect current, sensors to detect contaminants, sensors to detect cycle time, flow sensors and/or other sensors suitable for detecting various conditions experienced by the machine during the various stages of operation of the machine. In addition, one or more indicators can be provided in operative association with the control module for providing alerts or notifications of conditions detected and communicated to the control module. Such indicators can be conventional audio, visual, or audiovisual indications of a condition detected within a fluid system. The control module may also include one or more operatively associated data transmission devices or data storage media for storing, retrieving and/or reporting data communicated to the control module. Data stored within the data storage media may include a variety of data collected from the condition of the fluid system including, for example and without limitation, oil condition, particle count of contaminants, cycle time data for time to evacuate or time to refill a given reservoir, and/or fluid receptacle or fluid storage data.

The control module may include one or more controls for permitting manipulation of various elements of a fluid system and/or for receiving and processing data communicated from a fluid system. Machine controls can be provided for controlling various aspects of an engine, for example, such as ignition, pre-lubrication operations, initiating a fluid evacuation process, initiating a fluid refill process, initiating a kidney loop or filtration process, and various other machine operations. Pump controls can be provided for controlling the action of a pump or supplemental pump operatively associated with a fluid system, such as the fluid system of a machine, for example. One or more valve controls can be provided to actuate the position (e.g., open, closed, or other position) of one or more valves included within a fluid system. In addition, one or more multi-position valve controls can be provided to operate a multi-way valve or a multi-position valve apparatus or system. In addition, evacuation bracket controls can be provided for the particular function of one or more evacuation brackets included within, or introduced into, a fluid system as fluid components. In addition, in various embodiments described herein, it can be appreciated that the controls need not be located within the same location such as included within the same service panel, for example, or other like centralized location. It can be further appreciated that the controls may be operatively associated with a machine, a fluid system, a valve system, or other component by one or more wireline and/or wireless communication methods or systems.

Figure 6:
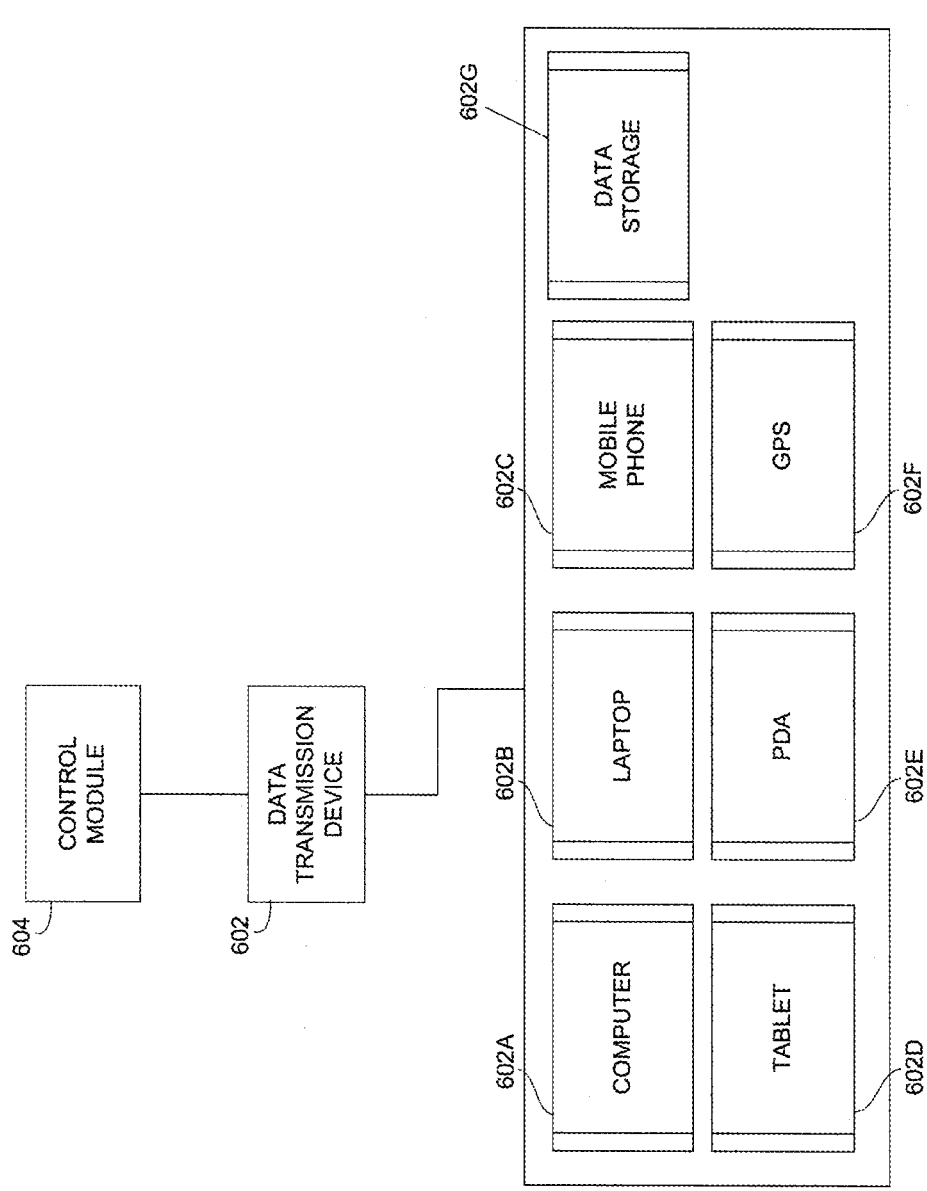
FIG. 6 includes a schematic depicting various examples of data communication and data processing in accordance with various embodiments of the invention.

Data can be communicated to the control module to and/or from a fluid system through a variety of methods, systems, or techniques. In various embodiments, data may be communicated, for example, by a wireline connection, communicated by satellite communications, cellular communications, infrared and/or communicated in accordance with a protocol such as IEEE 802.11, for example, or other wireless or radio frequency communication protocol among other similar types of communication methods and systems. As shown in FIG. 6, one or more data transmission devices 602 can be employed in operative association with a control module 604 for the purpose of receiving, processing, inputting and/or storing data and/or for cooperating with the control module 604 to control, monitor or otherwise manipulate one or more components included within a fluid system. Examples of data transmission devices 602 include, for example and without limitation, computers 602A, laptops 602B, mobile phones 602C, tablets 602D, and personal digital assistants (PDA's) 602E, and/or other data devices 602 suitable for executing instructions on one or more computer-readable media. The control module 604 may also include or may be operatively associated with a global positioning system ("GPS") 602F that can be programmed to determine a position of a machine, for example. In certain embodiments, the data transmission device 602 may include one or more types of data storage media 602G suitable for receiving data signals and/or storing data. In one example, a high fluid pressure filter triggering condition may generate a signal which represents the filter medium of the supplemental filter apparatus needing to be changed. Such a signal could be communicated wirelessly to a mobile device, for example, by use of the various media or devices described herein.

Various types of sensors can be employed in various embodiments to detect one or more conditions, states, or other characteristics of a fluid system, different fluids, or components employed in the fluid system. For example, the sensors can detect one or more of the following conditions within a fluid system: engine oil pressure, oil temperature in the engine, amount of current drawn by a pre-lubrication circuit, presence of contaminants (such as oil contaminants, for example) in the engine, amount of time that has elapsed for performance of one or more cycles of various engine operations (i.e., cycle time) such as pre-lubrication operations, fluid evacuation operations, fluid refill operations, fluid flow rates, and others. One example of a sensor that may be used in accordance with various embodiments of the present systems and methods is a contamination sensor marketed under the "LUBRIGARD" trade designation (Lubrigard Limited). A contamination sensor can provide information regarding oxidation products, water, glycol, metallic wear particles, and/or other contaminants that may be present in the engine oil, hydraulic oil, gearbox oil, transmission oil, compressor oil and/or other fluids used in various machines. In various aspects of the present methods and systems, the contamination sensor may be employed during one or more fluid processes, for example, such as a fluid evacuation process or a fluid refill process.

It can be appreciated that the control module can receive and store data associated with activation and deactivation of various components of a fluid system and operation of a machine, such as an engine, for example, included within the fluid system. Cycle time, for example, can be calculated from analysis of collected data to provide an indication of elapsed time for completing evacuation and/or refill operations. For a given oil temperature or temperature range (e.g., as can be detected and communicated by a temperature sensor), an average cycle time, for example, can be calculated through analysis of two or more collected cycle times. In one aspect, the present methods and systems can determine whether the most recently elapsed cycle time deviates from a nominal average cycle time, or range of cycle times, for a given oil temperature or temperature range. In addition, factors may be known such as the type and viscosity of fluids (e.g., such as oil) used in connection with operation of the machine. An unacceptable deviation from a nominal cycle time, or range of times, can result in recording a fault in a data storage medium operatively associated with the control module. It can be appreciated that many other types of fault conditions may detected, analyzed and recorded in connection with practice of the present systems and methods. In other illustrative examples, conditions associated with battery voltage, current, and/or the presence of contaminants in the machine, for example, may be detected, analyzed, and one or more fault conditions recorded by the control module.

In various embodiments, data collected from fluid system operation can be stored on an internal data module 117, 217, 317, 417 installed on or near a machine, for example. The internal data module 117, 217, 317, 417 can include a processor with an operatively associated memory. In one aspect, the internal data module 117, 217, 317, 417 can be a "one-shot" circuit, as that term is understood by those skilled in the art. The internal data module 117, 217, 317, 417 can be configured to receive and store data related to various conditions of a fluid system, a machine, a valve, a pump, or other components of a fluid system. In one embodiment, the internal data module 117, 217, 317, 417 can store data in the memory prior to engine ignition and then transfer the stored data to the control module, for example, or another computer system, once engine ignition is initiated. In another embodiment, the internal data module 117, 217, 317, 417 can store condition data for subsequent download to the control module or another suitable computer system. In various embodiments, the internal data module 117, 217, 317, 417 can be configured for use in performing data collection and storage functions when the control module is not otherwise active (e.g., during various machine service operations). In this manner, the internal data module 117, 217, 317, 417 can be employed to store data corresponding to the electrical events associated with an oil change, for example, or another type of fluid evacuation or refill procedure and can transmit data related to the procedure to the control module. In various embodiments, the internal data module 117, 217, 317, 417 can be a stand-alone, discrete module, or can be configured for full or partial integration into the operation of the control module.

Collected and analyzed data, as well as recorded fault events, can be stored in association with the control module, the internal data module 117, 217, 317, 417, and/or at a remote location. In various embodiments, the control module and/or the internal data module 117, 217, 317, 417 can be configured for operation as integral components of a machine or as remote components not installed locally on the machine. The collected and analyzed information can be stored in one or more of the data transmission devices and/or data storage media operatively associated with the control module, or on another conventional storage suitable for use in connection with the control module. The information can also be stored externally with respect to a machine and its components. Data can be transmitted wirelessly by a radio frequency communication or by a wireline connection from the control module to one or more data devices (as described herein). A mobile phone 602C, for example, may be configured and employed as a computer system for receiving and processing data collected from the control module during fluid evacuation and fluid refill processes.

In various embodiments, data can be collected, stored and/or analyzed for multiple reservoirs connected with, or operatively associated with, a machine. A control module or other data device can be employed to collect, store, and/or analyze data in accordance with one or more of the process steps shown in FIG. 5, for example, as well as in connection with other functions performed in connection with fluid operations and/or maintenance for a machine. In one example, the control module can be used to collect and analyze time-stamp information associated with an event such as an evacuation/refill process performed in connection with an oil reservoir, for example. Data such as current valve position, valve type, and/or reservoir type, for example, can be collected in connection with performance of an evacuation/refill procedure for a fluid reservoir, for example. Data stored within the data transmission devices and/or data storage media may include a variety of data collected from the condition of a fluid system including, for example and without limitation, oil condition; particle count of contaminants; cycle time data for time to evacuate or time to refill a given reservoir; time stamp data on a reservoir-by-reservoir basis; time stamp data on a component-by-component basis; time stamp data on a system-by-system basis; and/or, data associated with a fluid receptacle or another fluid storage medium.

Figure 7:
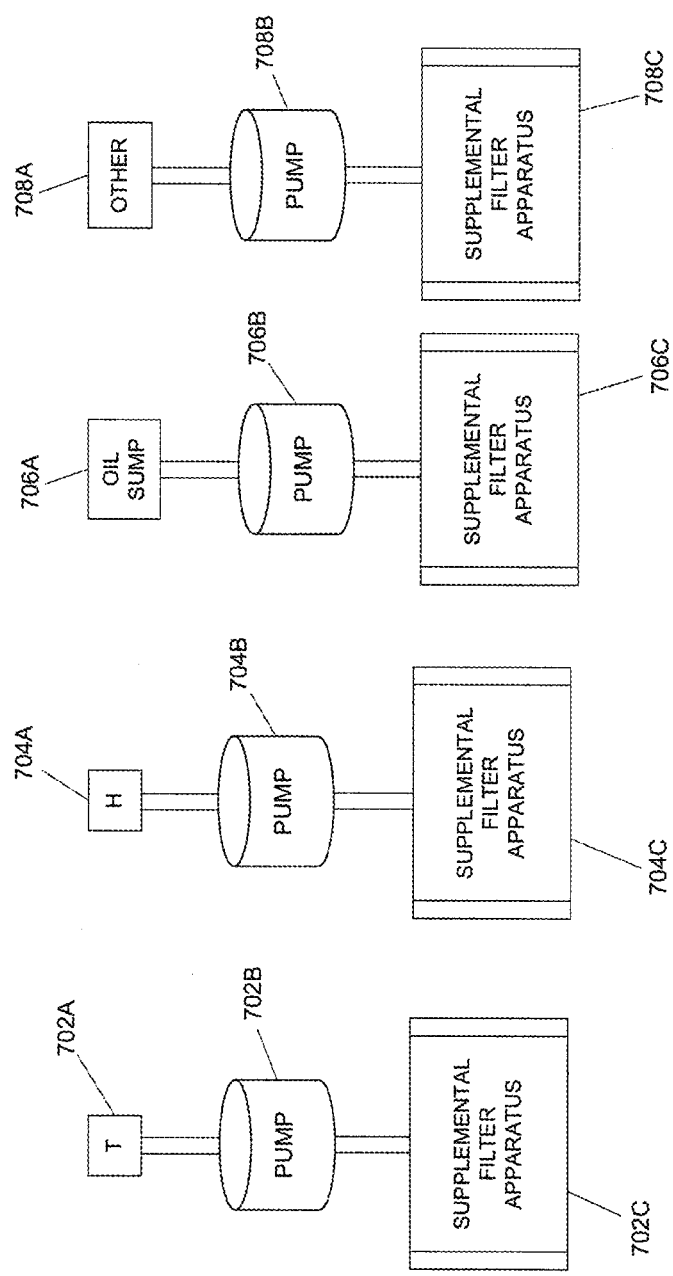
FIG. 7 schematically illustrates various examples of fluid reservoir and pump combinations that may be employed in association with various embodiments of the invention.

FIG. 7 schematically illustrates various examples of fluid reservoir and pump combinations that may be employed in association with various embodiments of the invention. As shown, each fluid reservoir 702A, 704A, 706A, 708A may be operatively associated with a pump or supplemental pump 702B, 704B, 706B, 708B. For example, one or more of the fluid reservoirs 702A, 704A, 706A, 708A may be a component of a power steering system or power braking system of a machine. In the example shown, one or more of the supplemental pumps 702B, 704B, 706B, 708B may be operatively associated with one or more supplemental filter apparatuses 702C, 704C, 706C, 708C. In certain embodiments, two or more fluid reservoirs may share a common pump and/or a common supplemental filter apparatus. Where operationally applicable, it can be appreciated that the multiple supplemental pump and/or multiple supplemental filter apparatus embodiments illustrated in FIG. 7 may be employed in connection with various embodiments of machines and fluid filtration apparatuses described herein. In one example, fluid such as the engine oil of a machine may be filtered through a supplemental filter apparatus and then returned back to the fuel tank of the machine to be used as fuel.

Figure 8:
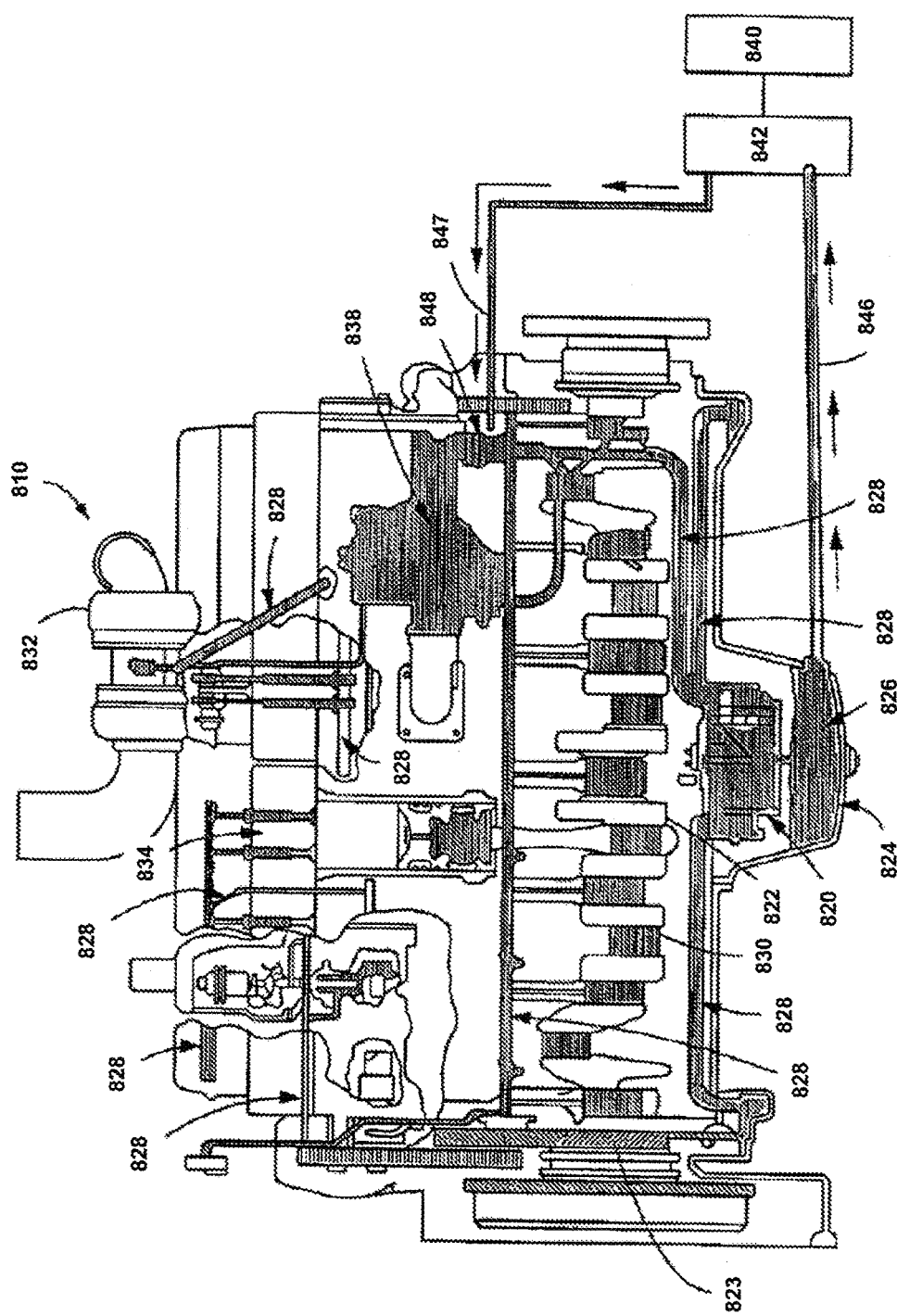
FIG. 8 is a side view in partially schematic form of an engine that may be employed in connection with various embodiments of the invention, with portions broken away or not shown for convenience of disclosure.

Referring now to FIG. 8, for purposes of illustrating an operative environment for certain embodiments of the invention, a diesel engine 810 is shown having portions removed and/or broken away for convenience of illustration of the lubrication system of the engine 810. It can be appreciated that the diesel engine 810 is shown and described herein merely for purposes of convenience of disclosure and illustration and that many other machines, as defined herein, can be employed in accordance with the various embodiments of the present systems and methods. The lubrication system may include a main oil pump 820 that is mechanically driven from the crankshaft 822 of the engine 810. When actuated by rotation of crankshaft 822, the main oil pump 820 draws oil from a sump 824 through a screening element 826 and distributes it under pressure through a plurality of conduits 828. The pressurized oil is delivered to the crankshaft bearings 830 of the engine 810, to the turbocharger unit 832, to the valve train assembly 834, to the pistons 836, through a filtering assembly 838, and to other engine components that require lubrication. It can be appreciated that one or more valves and/or passages (not shown) may be included within the lubrication system of the engine 810 to control the flow of oil provided to various engine components.

Figure 9:
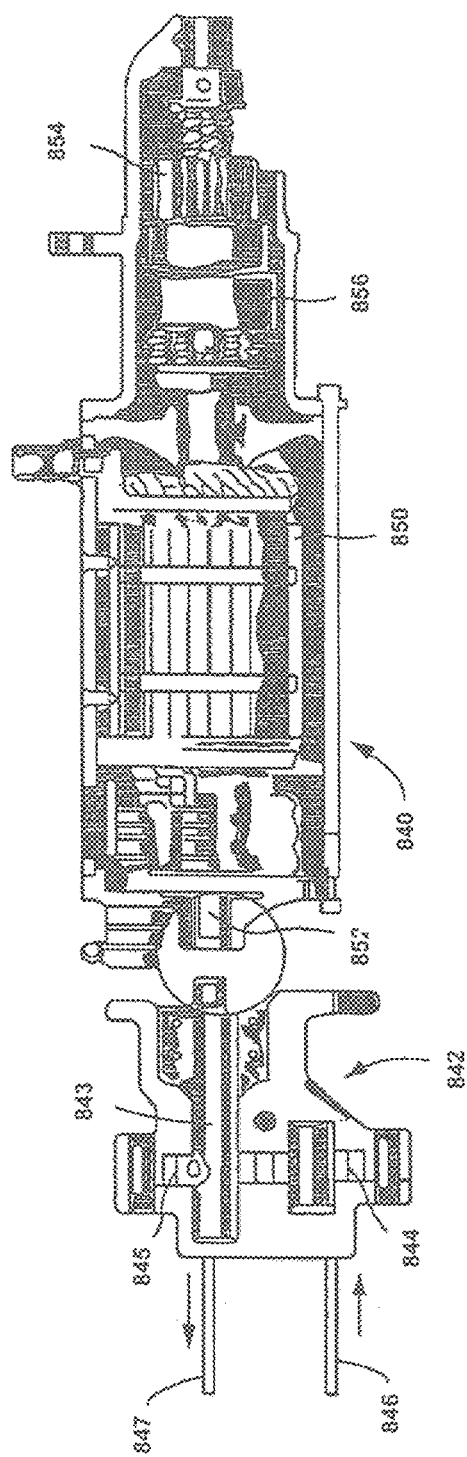
FIG. 9 is a sectional side view of a starter and a pre-ignition oil pump mechanism structured for use in connection with the engine of FIG. 8.

Referring now to FIGS. 8 and 9, during operation of the engine 810, the main oil pump 820 is not actuated until the crankshaft 822 begins to rotate due to the operation of an electromechanical starter assembly 840. The starter assembly 840 can be conventional in configuration and can include a direct current motor assembly 850 having an armature shaft 852 extending therethrough. The armature shaft 852 supports a starter gear 854 adjacent to one end of the starter assembly 840. The starter gear 854 engages a flywheel 823 to rotatably drive crankshaft 822 when actuated. A bendix drive mechanism 856 controls the axial movement of the starter gear 854 to engage and disengage the starter gear 854 from the flywheel 823. Because a significant time period can elapse before the main oil pump 820 is able to achieve normal operating oil pressure in the lubrication system, vital components of the engine 810 may move and interact through a number of cycles with little or no lubrication pressure. This can result in undesirably excessive wear and premature failure of engine components.

In various embodiments, a pre-lubrication electromechanical system can be activated prior to combustion in the engine 810 and rotation of the crankshaft 822. The pre-lubrication system can be employed to at least some lubricating oil pressure before initial movement and interaction of engine 810 components. To provide lubrication to the engine 810 components, the pre-lubrication system can include a supplemental oil pump 842 operatively connected to the starter assembly 840. In one aspect, the supplemental oil pump 842 can include a mechanically driven gear-type oil pump having an elongated drive shaft 843 and gears 844, 845. It can be seen that the supplemental oil pump 842 communicates with the lubrication system of the engine 810 through an oil inlet line 846, an oil output line 847, and a check valve 848. The drive shaft 843 of the supplemental oil pump 842 may be connected to the armature shaft 852 of the starter motor 840 opposite the starter gear 854 in any convenient manner, so that the two shafts 843, 852 can rotate together. The supplemental oil pump 842 and the starter motor 840 may be conveniently incorporated within a single housing to form an integral unit. In certain embodiments, the supplemental oil pump 842 can be installed as an on-board component of the engine 810, or as a remotely positioned external pump.

In certain embodiments, the check valve 848 can be mounted on the engine 810 adjacent to the outlet line 847 to resist oil backflow while the supplemental oil pump 842 is inoperative. This check valve 848 can also resist spinning of the starter assembly 840 caused by oil flow during normal operation of the engine 810. It can be seen that failure of the supplemental oil pump 842 would not render the engine 810 inoperative, thereby avoiding potentially expensive downtime and maintenance for the engine 810 and its associated equipment. Likewise, because the supplemental oil pump 842 pumps oil through the filtering assembly 838 before the oil enters the engine 810, failure of the supplemental oil pump 842 would not likely introduce damaging particles into the engine 810.

Various aspects of the following disclosure include operational examples for the various system and method embodiments described herein. It can be appreciated that such operational examples are provided merely for convenience of disclosure, and that no particular aspect or aspects of these operational examples are intended to limit the scope of application of the present systems and methods.

Where applicable and operational in the context of various embodiments of valve assemblies and systems described herein, one or more valves may be in a normally closed or normally open position prior to, during, or after performance of a particular fluid operation. In addition, one or more types of valves may be employed in certain embodiments of the present systems and methods (e.g., a reasonable combination of check valves and/or electronic valves may be employed).

It can be appreciated that, where applicable and operational in the context of various embodiments of valve assemblies and systems described herein, performing a refill fluid operation to a pre-filter portion of a fluid system improves filtration of the refill fluid. In various embodiments, the refill fluid encounters at least one filter, for example, before the refill fluid encounters various other operative components of the fluid system.

Data can be communicated with the control modules to and/or from a fluid system through a variety of methods and systems. In various embodiments disclosed herein, data may be communicated, for example, by a wireline connection, communicated by satellite communications, cellular communications, infrared and/or communicated in accordance with a wireless or radio frequency communication protocol among other similar types of communication methods and systems. One or more data devices can be employed in operative association with the control modules for the purpose of receiving, processing, inputting and/or storing data and/or for cooperating with the control modules to control, monitor or otherwise manipulate one or more components included within a fluid system.

In one illustrative example, information related to an oil filter purge operation, such as the date and time of the filter purge or the cycle time of the filter purge, for example, and/or other machine conditions can be recorded and processed in connection with operation of the control modules. In addition, the condition (e.g., open or closed) of various valve inlets and outlets, and the date/time at which they are actuated, may be detected, recorded and/or analyzed for various fluid operations. In accordance with the systems and methods disclosed herein, data may be collected and recorded on a reservoir-by-reservoir basis and/or on a fluid system-by-fluid system basis as service is performed on a machine, for example.

It should be appreciated that all the figures are presented for illustrative purposes and not as construction drawings. Omitted details and modifications or alternative embodiments are within the purview of persons of ordinary skill in the art. Furthermore, whereas particular embodiments of the invention have been described herein for the purpose of illustrating the invention and not for the purpose of limiting the same, it will be appreciated by those of ordinary skill in the art that numerous variations of the details, materials and arrangement of parts may be made within the principle and scope of the invention without departing from the invention as described in the appended claims.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention.

Any element expressed herein as a means for performing a specified function is intended to encompass any way of performing that function including, for example, a combination of elements that performs that function. Furthermore the invention, as may be defined by such means-plus-function claims, resides in the fact that the functionalities provided by the various recited means are combined and brought together in a manner as defined by the appended claims. Therefore, any means that can provide such functionalities may be considered equivalents to the means shown herein.

In various embodiments, modules or software can be used to practice certain aspects of the invention. For example, software-as-a-service (SaaS) models or application service provider (ASP) models may be employed as software application delivery models to communicate software applications to clients or other users. Such software applications can be downloaded through an Internet connection, for example, and operated either independently (e.g., downloaded to a laptop or desktop computer system) or through a third-party service provider (e.g., accessed through a third-party web site). In addition, cloud computing techniques may be employed in connection with various embodiments of the invention. In certain embodiments, a "module" may include software, firmware, hardware, or any reasonable combination thereof.

Moreover, the processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary.

A "computer," "computer system," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media. In various embodiments, a "host," "engine," "updater," "loader," "filter," "platform," or "component" may include various computers or computer systems, or may include a reasonable combination of software, firmware, and/or hardware.

In various embodiments of the present invention, a single component may be replaced by multiple components, and multiple components may be replaced by a single component, to perform a given function or functions. Except where such substitution would not be operative to practice embodiments of the present invention, such substitution is within the scope of the present invention. Any of the servers described herein, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

In general, it will be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present invention. For example, the embodiments described hereinabove may be implemented in computer software using any suitable computer programming language such as .NET, SQL, MySQL, or HTML using, for example, conventional or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high level languages include Ada, BASIC, C, C++, C#, COBOL, Fortran, Java, Lisp, Pascal, Object Pascal; and examples of scripting languages include Bourne script, JavaScript, Python, Ruby, PHP, and Perl. Various embodiments may be employed in a Lotus Notes environment, for example. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present invention based on the description herein with only a reasonable effort and without undue experimentation.

Various embodiments of the systems and methods described herein may employ one or more electronic computer networks to promote communication among different components, transfer data, or to share resources and information. Such computer networks can be classified according to the hardware and software technology that is used to interconnect the devices in the network, such as optical fiber, Ethernet, wireless LAN, HomePNA, power line communication or G.hn. The computer networks may also be embodied as one or more of the following types of networks: local area network (LAN); metropolitan area network (MAN); wide area network (WAN); virtual private network (VPN); storage area network (SAN); or global area network (GAN), among other network varieties.

For example, a WAN computer network may cover a broad area by linking communications across metropolitan, regional, or national boundaries. The network may use routers and/or public communication links. One type of data communication network may cover a relatively broad geographic area (e.g., city-to-city or country-to-country) which uses transmission facilities provided by common carriers, such as telephone service providers. In another example, a GAN computer network may support mobile communications across multiple wireless LANs or satellite networks. In another example, a VPN computer network may include links between nodes carried by open connections or virtual circuits in another network (e.g., the Internet) instead of by physical wires. The link-layer protocols of the VPN can be tunneled through the other network. One VPN application can promote secure communications through the Internet. The VPN can also be used to separately and securely conduct the traffic of different user communities over an underlying network. The VPN may provide users with the virtual experience of accessing the network through an IP address location other than the actual IP address which connects the access device to the network.

The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments described herein may employ internetworking for connecting two or more distinct electronic computer networks or network segments through a common routing technology. The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures. As applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity. As applied herein, an extranet may include a network or internetwork generally limited to a primary organization or entity, but which also has limited connections to the networks of one or more other trusted organizations or entities (e.g., customers of an entity may be given access an intranet of the entity thereby creating an extranet).

Computer networks may include hardware elements to interconnect network nodes, such as network interface cards (NICs) or Ethernet cards, repeaters, bridges, hubs, switches, routers, and other like components. Such elements may be physically wired for communication and/or data connections may be provided with microwave links (e.g., IEEE 802.12) or fiber optics, for example. A network card, network adapter or NIC can be designed to allow computers to communicate over the computer network by providing physical access to a network and an addressing system through the use of MAC addresses, for example. A repeater can be embodied as an electronic device that receives and retransmits a communicated signal at a boosted power level to allow the signal to cover a telecommunication distance with reduced degradation. A network bridge can be configured to connect multiple network segments at the data link layer of a computer network while learning which addresses can be reached through which specific ports of the network. In the network, the bridge may associate a port with an address and then send traffic for that address only to that port. In various embodiments, local bridges may be employed to directly connect local area networks (LANs); remote bridges can be used to create a wide area network (WAN) link between LANs; and/or, wireless bridges can be used to connect LANs and/or to connect remote stations to LANs.

In various embodiments, a hub may be employed which contains multiple ports. For example, when a data packet arrives at one port of a hub, the packet can be copied unmodified to all ports of the hub for transmission. A network switch or other devices that forward and filter OSI layer 2 datagrams between ports based on MAC addresses in data packets can also be used. A switch can possess multiple ports, such that most of the network is connected directly to the switch, or another switch that is in turn connected to a switch. The term "switch" can also include routers and bridges, as well as other devices that distribute data traffic by application content (e.g., a Web URL identifier). Switches may operate at one or more OSI model layers, including physical, data link, network, or transport (i.e., end-to-end). A device that operates simultaneously at more than one of these layers can be considered a multilayer switch. In certain embodiments, routers or other like networking devices may be used to forward data packets between networks using headers and forwarding tables to determine an optimum path through which to transmit the packets.

As employed herein, an application server may be a server that hosts an API to expose business logic and business processes for use by other applications. Examples of application servers include J2EE or Java EE 5 application servers including WebSphere Application Server. Other examples include WebSphere Application Server Community Edition (IBM), Sybase Enterprise Application Server (Sybase Inc), WebLogic Server (BEA), JBoss (Red Hat), JRun (Adobe Systems), Apache Geronimo (Apache Software Foundation), Oracle OC4J (Oracle Corporation), Sun Java System Application Server (Sun Microsystems), and SAP Netweaver AS (ABAP/Java). Also, application servers may be provided in accordance with the .NET framework, including the Windows Communication Foundation, .NET Remoting, ADO.NET, and ASP.NET among several other components. For example, a Java Server Page (JSP) is a servlet that executes in a web container which is functionally equivalent to CGI scripts. JSPs can be used to create HTML pages by embedding references to the server logic within the page. The application servers may mainly serve web-based applications, while other servers can perform as session initiation protocol servers, for instance, or work with telephony networks. Specifications for enterprise application integration and service-oriented architecture can be designed to connect many different computer network elements. Such specifications include Business Application Programming Interface, Web Services Interoperability, and Java EE Connector Architecture.

In various embodiments, computers and computer systems described herein may have the following main components: arithmetic and logic unit (ALU), control unit, memory, and input and output devices (I/O devices). These components can be interconnected by busses, often comprising groups of wires or cables. The control unit, ALU, registers, and basic I/O (and often other hardware closely linked with these sections) can be collectively considered a central processing unit (CPU) for the computer system. The CPU may be constructed on a single integrated circuit or microprocessor. The control unit (control system or central controller) directs the various components of a computer system. The control system decodes each instruction in a computer program and turns it into a series of control signals that operate other components of the computer system. To enhance performance or efficiency of operation, the control system may alter the order of instructions. One component of the control unit is the program counter, a memory register that tracks the location in memory from which the next instruction is to be read.

The ALU is capable of performing arithmetic and logic operations. The set of arithmetic operations that a particular ALU supports may be limited to adding and subtracting or might include multiplying or dividing, trigonometry functions (sine, cosine, etc.) and square roots. Some may be programmed to operate on whole numbers (integers), while others use floating point to represent real numbers, for example. An ALU may also compare numbers and return Boolean truth values (e.g., true or false). Superscalar computers may contain multiple ALUs to facilitate processing multiple instructions at the same time. For example, graphics processors and computers with SIMD and MIMD features often possess ALUs that can perform arithmetic operations on vectors and matrices. Certain computer systems may include one or more RAM cache memories configured to move more frequently needed data into the cache automatically.

Examples of peripherals that may be used in connection with certain embodiments of the invention include input/output devices such as keyboards, mice, screen displays, monitors, printers, hard disk drives, floppy disk drives, joysticks, and image scanners.

Embodiments described herein may divide functions between separate CPUs, creating a multiprocessing configuration. For example, multiprocessor and multi-core (multiple CPUs on a single integrated circuit) computer systems with co-processing capabilities may be employed. Also, multitasking may be employed as a computer processing technique to handle simultaneous execution of multiple computer programs.

In various embodiments, the computer systems, data transmission devices, data storage media, or modules described herein may be configured and/or programmed to include one or more of the above-described electronic, computer-based elements and components, or computer architecture. In addition, these elements and components may be particularly configured to execute the various rules, algorithms, programs, processes, and method steps described herein.

While the present embodiments have been principally described in relation to engines, it will be recognized that the invention is also useful in a wide variety of other types of machines. For example, use of the different embodiments in automotive applications is contemplated, such as in connection with automotive engines. Therefore, whereas particular embodiments of the invention have been described herein for the purpose of illustrating the invention and not for the purpose of limiting the same, it can be appreciated by those of ordinary skill in the art that numerous variations of the details, materials and arrangement of parts may be made within the principle and scope of the invention without departing from the invention as described in the appended claims.

What is claimed is:

1. A fluid filtration apparatus, comprising:
   a pump, wherein the pump is a supplement to a main pump of an engine;
   a filter apparatus;
   a valve assembly, wherein:
      an inlet of the valve assembly shares a common junction with an outlet of the pump and an inlet of the filter apparatus; and
      an outlet of the valve assembly shares a common junction with an inlet of the engine;
   a sensor configured to detect a filter triggering condition; and
   a control module coupled to the sensor, wherein the control module is configured to control operation of the pump based on the detected filter triggering condition.

2. The fluid filtration apparatus of claim 1, wherein an inlet of the pump is coupled to a fluid reservoir.

3. The fluid filtration apparatus of claim 1, wherein the filter apparatus comprises a fine filtration medium.

4. The fluid filtration apparatus of claim 1, wherein the filter apparatus comprises at least one of the following:
   an electrical filter;
   a magnetic filter;
   a centrifugal filter;
   a paper-based filter; and
   a synthetic filter.

5. The fluid filtration apparatus of claim 1, wherein the outlet of the valve assembly further shares a common junction with an outlet of the filter apparatus.

6. The fluid filtration apparatus of claim 1, wherein the sensor is further configured to output a signal indicative of the detected filter triggering condition.

7. The fluid filtration apparatus of claim 1, wherein the filter triggering condition is associated with a condition of a fluid.

8. The fluid filtration apparatus of claim 1, wherein the filter triggering condition is associated with an occurrence of a predetermined event.

9. The fluid filtration apparatus of claim 1, wherein the control module is further configured to control operation of the valve assembly.

10. The fluid filtration apparatus of claim 1, wherein the control module is further configured to activate the pump based on the detected filter triggering condition.

11. The fluid filtration apparatus of claim 1, wherein the control module is further configured to deactivate the pump.

12. A fluid filtration apparatus, comprising:
   a pump, wherein the pump is a supplement to a main pump of an engine;

a filter apparatus;

a valve assembly comprising a check valve, wherein:
- an inlet of the valve assembly shares a common junction with an outlet of the pump and an inlet of the filter apparatus; and
- an outlet of the valve assembly shares a common junction with an inlet of the engine;

a sensor configured to detect a filter triggering condition; and a control module coupled to the sensor, wherein the control module is configured to control operation of the pump based on the detected filter triggering condition.

13. The fluid filtration apparatus of claim 12, wherein the control module is further configured to activate the pump based on the detected filter triggering condition.

14. The fluid filtration apparatus of claim 12, wherein the control module is further configured to deactivate the pump.

15. The fluid filtration apparatus of claim 12, further comprising a second valve assembly, wherein an inlet of the second valve assembly shares a common junction with an outlet of the filter apparatus.

16. The fluid filtration apparatus of claim 15, wherein the control module is further configured to control operation of the second valve assembly.

\* \* \* \* \*